US011871188B2

(12) United States Patent
Keum et al.

(10) Patent No.: US 11,871,188 B2
(45) Date of Patent: Jan. 9, 2024

(54) ELECTRONIC DEVICE INCLUDING A MICROPHONE ARRAY

(71) Applicant: Samsung Electronics Co., Ltd., Gyeonggi-do (KR)

(72) Inventors: Jong Mo Keum, Seoul (KR); Min Ho Bae, Seoul (KR); Jung Yeol An, Seoul (KR); Gang Youl Kim, Gyeonggi-do (KR); Jun Tai Kim, Gyeonggi-do (KR); Jae Mo Yang, Gyeonggi-do (KR); Nam Il Lee, Gyeonggi-do (KR); Ho Chul Hwang, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 327 days.

(21) Appl. No.: 17/226,252

(22) Filed: Apr. 9, 2021

(65) Prior Publication Data

US 2021/0227322 A1 Jul. 22, 2021

Related U.S. Application Data

(63) Continuation of application No. 16/988,792, filed on Aug. 10, 2020, now Pat. No. 11,019,427, which is a continuation of application No. 16/503,701, filed on Jul. 5, 2019, now Pat. No. 10,743,103, which is a continuation of application No. 15/782,971, filed on Oct. 13, 2017, now Pat. No. 10,390,132, which is a continuation of application No. 14/841,929, filed on Sep. 1, 2015, now Pat. No. 9,820,041.

(30) Foreign Application Priority Data

Sep. 1, 2014 (KR) ........................ 10-2014-0115745

(51) Int. Cl.
*H04R 3/00* (2006.01)

(52) U.S. Cl.
CPC ....... *H04R 3/005* (2013.01); *H04R 2201/401* (2013.01); *H04R 2499/11* (2013.01)

(58) Field of Classification Search
CPC .............................. H04R 3/005; H04R 29/005; H04R 2201/401; H04R 2499/11; H04R 2499/15
USPC ........................ 381/56, 58, 91, 92, 122, 123
See application file for complete search history.

(56) References Cited

U.S. PATENT DOCUMENTS 8,718,290 B2 5/2014 Murgia et al.
8,811,626 B2 8/2014 Hata et al.
8,988,480 B2 3/2015 Dave et al.
(Continued)

FOREIGN PATENT DOCUMENTS

HK 2009-208440 A 9/2009
KR 10-2013-0082339 A 7/2013
(Continued)

OTHER PUBLICATIONS

Korean Notice of Allowance dated Apr. 8, 2021.

*Primary Examiner* — William A Jerez Lora
(74) *Attorney, Agent, or Firm* — Cha & Reiter, LLC

(57) ABSTRACT

An electronic device comprising: a microphone array including at least three microphones; and at least one processor configured to: identify a kind of an application that is executed; activate one or more of the microphones in the array based on each microphone's respective position within the electronic device and the type of the application; and capture audio using the activated microphones.

10 Claims, 12 Drawing Sheets

(56) References Cited

U.S. PATENT DOCUMENTS

| | | | | |
|---|---|---|---|---|
| 9,048,665 | B2 | 6/2015 | Wojcik et al. | |
| 9,094,645 | B2 | 7/2015 | Kim et al. | |
| 9,251,805 | B2 | 2/2016 | Aratsu et al. | |
| 9,805,733 | B2 | 10/2017 | Park | |
| 9,820,041 | B2 | 11/2017 | Kum et al. | |
| 10,347,246 | B2 | 7/2019 | Lee et al. | |
| 10,390,132 | B2 | 8/2019 | Keum et al. | |
| 10,475,464 | B2 | 11/2019 | Park | |
| 10,743,103 | B2 | 8/2020 | Keum et al. | |
| 2008/0298602 | A1* | 12/2008 | Wolff | H04M 9/082 704/E21.007 |
| 2010/0081487 | A1 | 4/2010 | Chen et al. | |
| 2011/0013075 | A1 | 1/2011 | Kim et al. | |
| 2011/0142253 | A1 | 6/2011 | Hata et al. | |
| 2011/0182436 | A1 | 7/2011 | Murgia et al. | |
| 2012/0099732 | A1* | 4/2012 | Visser | H04R 3/005 381/17 |
| 2013/0179173 | A1 | 7/2013 | Lee et al. | |
| 2013/0272097 | A1 | 10/2013 | Kim et al. | |
| 2013/0272538 | A1 | 10/2013 | Kim et al. | |
| 2013/0272539 | A1 | 10/2013 | Kim et al. | |
| 2013/0275077 | A1 | 10/2013 | Kim et al. | |
| 2013/0275872 | A1 | 10/2013 | Kim et al. | |
| 2013/0275873 | A1 | 10/2013 | Shaw et al. | |
| 2013/0343572 | A1* | 12/2013 | Lee | H04R 1/406 381/92 |
| 2014/0012587 | A1 | 1/2014 | Park | |
| 2014/0071221 | A1 | 3/2014 | Dave et al. | |
| 2014/0105416 | A1 | 4/2014 | Huttunen et al. | |
| 2014/0172426 | A1 | 6/2014 | Aratsu et al. | |
| 2014/0205107 | A1 | 7/2014 | Murgia et al. | |
| 2015/0055798 | A1 | 2/2015 | Moon et al. | |
| 2015/0163578 | A1 | 6/2015 | Dave et al. | |
| 2015/0163587 | A1* | 6/2015 | Li | H04R 1/326 348/159 |
| 2015/0312691 | A1 | 10/2015 | Virolainen et al. | |
| 2016/0064002 | A1 | 3/2016 | Kim et al. | |
| 2018/0047406 | A1 | 2/2018 | Park | |

FOREIGN PATENT DOCUMENTS

| | | | |
|---|---|---|---|
| KR | 10-2014-0005410 | A | 1/2014 |
| WO | 2014-037765 | A1 | 3/2014 |

* cited by examiner

ELECTRONIC DEVICE INCLUDING A MICROPHONE ARRAY

CROSS REFERENCE TO RELATED APPLICATIONS

This application is a Continuation Application of Ser. No. 16/988,792 filed on Aug. 10, 2020, which is a Continuation application of U.S. patent application Ser. No. 16/503,701 filed on Jul. 5, 2019, and assigned U.S. Pat. No. 10,743,103 issued on Aug. 11, 2020, which is a Continuation Application of U.S. patent application Ser. No. 15/782,971 filed Oct. 13, 2017, and assigned U.S. Pat. No. 10,390,132 issued on Aug. 20, 2019, which claims the benefit of the earlier U.S. patent application Ser. No. 14/841,929 filed on Sep. 1, 2015, and assigned U.S. Pat. No. 9,820,041 issued on Nov. 14, 2017, which claims the benefit under 35 U.S.C. § 119(a) of a Korean Patent Application filed on Sep. 1, 2014, in the Korean Intellectual Property Office and assigned Serial number 10-2014-0115745, the entire disclosure of which is hereby incorporated by reference.

TECHNICAL FIELD

The present disclosure relates to electronic devices in general, and more particularly to an electronic device including a microphone array.

BACKGROUND

With the recent development of digital technology, mobile electronic devices capable of processing communication and personal information, for example, mobile communication terminals, Personal Digital Assistants (PDAs), electronic organizers, smartphones, tablet Personal Computers (PCs), and so on, have been variously released. Such a conventional electronic device includes a microphone relating to audio data collection.

The conventional electronic device includes one microphone disposed thereat. Accordingly, data collected through one microphone may be general information or information containing noise a lot. Accordingly, the conventional electronic device has limitations in obtaining the accurate voice recognition for collected audio data.

SUMMARY

According to aspects of the disclosure, an electronic device is provided comprising: a microphone array including at least three microphones; and at least one processor configured to: identify a kind (a type, a sorts, a species etc.) of an application that is executed; activate one or more of the microphones in the array based on each microphone's respective position within the electronic device and the type of the application; and capture audio using the activated microphones According to aspects of the disclosure, a method is provided comprising: identifying a kind (a type, a sort, a species, etc.) of an application that is executed by an electronic device having a microphone array; activating one or more of the microphones in the array based on each microphone's respective position within the electronic device and the type of the application; and capturing audio using the activated microphones.

DETAILED DESCRIPTION

Figure 1:
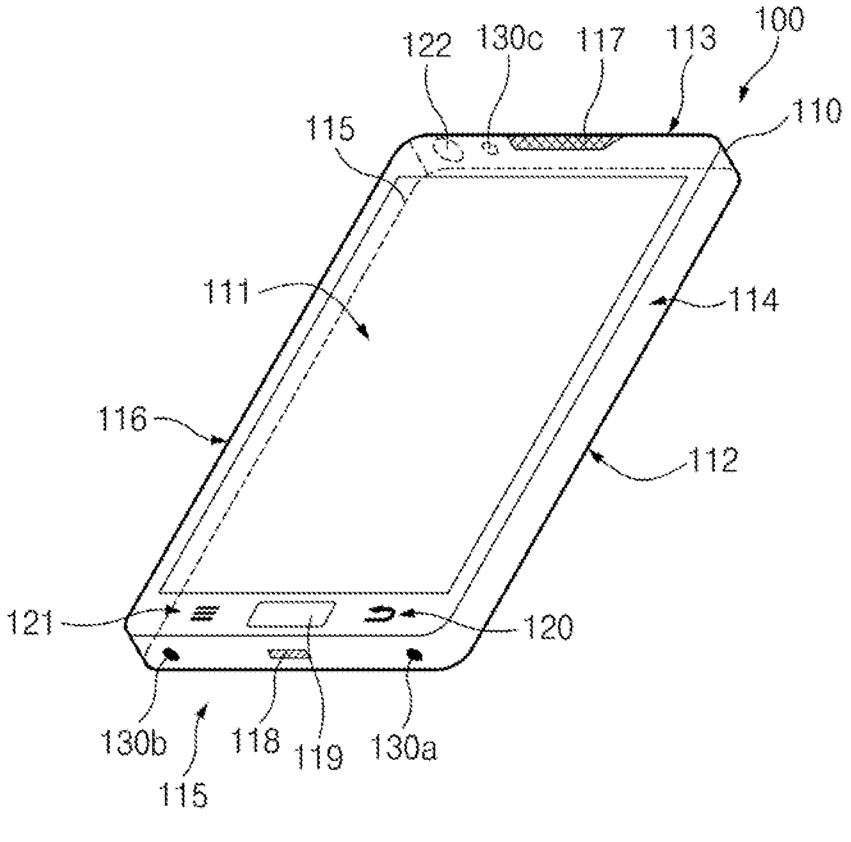
FIG. 1 is a diagram of an example of an electronic device including a plurality of microphones according to various embodiments of the present disclosure.

Hereinafter, various embodiments of the present disclosure are disclosed with reference to the accompanying drawings. However, this does not limit various embodiments of the present disclosure to a specific embodiment and it should be understood that the present disclosure covers all the modifications, equivalents, and/or alternatives of this disclosure provided they come within the scope of the appended claims and their equivalents. With respect to the descriptions of the drawings, like reference numerals refer to like elements.

The term “include,” “comprise,” and “have”, or “may include,” or “may comprise” and “may have” used herein indicates disclosed functions, operations, or existence of elements but does not exclude other functions, operations or elements.

For instance, the expression “A or B”, or “at least one of A or/and B” may indicate include A, B, or both A and B. For instance, the expression “A or B”, or “at least one of A or/and B” may indicate (1) at least one A, (2) at least one B, or (3) both at least one A and at least one B.

The terms such as “1st”, “2nd”, “first”, “second”, and the like used herein may refer to modifying various different elements of various embodiments of the present disclosure, but do not limit the elements. The expressions may be used to distinguish one element from another element. For instance, “a first user device” and “a second user device” may indicate different users regardless of the order or the importance. For example, a first component may be referred to as a second component and vice versa without departing from the scope of the present disclosure.

In various embodiments of the present disclosure, it will be understood that when a component (for example, a first component) is referred to as being “(operatively or communicatively) coupled with/to” or “connected to” another component (for example, a second component), the component may be directly connected to the other component or connected through another component (for example, a third component). In various embodiments of the present disclosure, it will be understood that when a component (for example, a first component) is referred to as being "directly connected to" or "directly access" another component (for example, a second component), another component (for example, a third component) does not exist between the component (for example, the first component) and the other component (for example, the second component).

The expression "configured to" used in various embodiments of the present disclosure may be interchangeably used with "suitable for", "having the capacity to", "designed to", "adapted to", "made to", or "capable of" according to a situation, for example. The term "configured to" may not necessarily mean "specifically designed to" in terms of hardware. Instead, the expression "a device configured to" in some situations may mean that the device and another device or part are "capable of". For example, "a processor configured to perform A, B, and C" in a phrase may mean a dedicated processor (for example, an embedded processor) for performing a corresponding operation or a generic-purpose processor (for example, a CPU or application processor) for performing corresponding operations by executing at least one software program stored in a memory device.

Terms used in various embodiments of the present disclosure are used to describe specific embodiments of the present disclosure, and are not intended to limit the scope of other embodiments. The terms of a singular form may include plural forms unless they have a clearly different meaning in the context. Otherwise indicated herein, all the terms used herein, which include technical or scientific terms, may have the same meaning that is generally understood by a person skilled in the art. In general, the terms defined in the dictionary should be considered to have the same meaning as the contextual meaning of the related art, and, unless clearly defined herein, should not be understood abnormally or as having an excessively formal meaning. In any cases, even the terms defined in this specification cannot be interpreted as excluding embodiments of the present disclosure.

According to various embodiments of the present disclosure, electronic devices may include at least one of smartphones, tablet personal computers (PCs), mobile phones, video phones, electronic book (e-book) readers, desktop personal computers (PCs), laptop personal computers (PCs), netbook computers, workstation server, personal digital assistants (PDAs), portable multimedia player (PMPs), MP3 players, mobile medical devices, cameras, and wearable devices (for example, smart glasses, head-mounted-devices (HMDs), electronic apparel, electronic bracelets, electronic necklaces, electronic appcessories, electronic tattoos, smart mirrors, and smart watches).

According to some embodiments of the present disclosure, an electronic device may be smart home appliances. The smart home appliances may include at least one of, for example, televisions, digital video disk (DVD) players, audios, refrigerators, air conditioners, cleaners, ovens, microwave ovens, washing machines, air cleaners, set-top boxes, home automation control panels, security control panels, TV boxes (e.g., Samsung HomeSync™, Apple TV™ or Google TV™, game consoles (for example, Xbox™ and PlayStation™) electronic dictionaries, electronic keys, camcorders, and electronic picture frames.

According to some embodiments of the present disclosure, an electronic device may include at least one of various medical devices supporting call forwarding service (for example, various portable measurement devices (for example, glucometers, heart rate meters, blood pressure meters, temperature meters, etc.), magnetic resonance angiography (MRA) devices, magnetic resonance imaging (MRI) devices, computed tomography (CT) devices, medical imaging devices, ultrasonic devices, etc.), navigation devices, global positioning system (GPS) receivers, event data recorders (EDRs), flight data recorders (FDRs), vehicle infotainment devices, marine electronic equipment (for example, marine navigation systems, gyro compasses, etc.), avionics, security equipment, vehicle head units, industrial or household robots, financial institutions' automatic teller's machines (ATMs), or stores' point of sales (POS) or internet of things (for example, bulbs, various sensors, electric or gas meters, sprinkler systems, fire alarms, thermostats, street lights, toasters, exercise equipment, hot water tanks, heaters, boilers, etc.).

In various embodiments of the present disclosure, an electronic device may include at least one of part of furniture or buildings/structures supporting call forwarding service, electronic boards, electronic signature receiving devices, projectors, and various measuring instruments (for example, water, electricity, gas, or radio signal measuring instruments). An electronic device according to various embodiments of the present disclosure may be one of the above-mentioned various devices or a combination thereof. Additionally, an electronic device according to an embodiment of the present disclosure may be a flexible electronic device. Additionally, an electronic device according to an embodiment of the present disclosure is not limited to the above-mentioned devices and may include a new kind of an electronic device according to the technology development.

Hereinafter, an electronic device according to various embodiments of the present disclosure will be described in more detail with reference to the accompanying drawings. The term "user" in this disclosure may refer to a person using an electronic device or a device using an electronic device (for example, an artificial intelligent electronic device).

FIG. 1 is a diagram of an example of an electronic device including a plurality of microphones according to various embodiments of the present disclosure.

Referring to FIG. 1, an enclosure 110 of an electronic device 100 may include a front part 111 (e.g., a top surface), a rear part 112 (e.g., a bottom surface), an upper part 113 (e.g., an upper sidewall), a right part 114, (e.g., a right sidewall) a lower part 115 (e.g., a lower sidewall), and a left part 116, (e.g., a left sidewall). For example, a receiver 117, a home key 119, a touch key 120, and a touch key 121 may be disposed at the front part 111. For example, an audio jack 122 may be disposed at the upper part 113. A connector 118 may be disposed at the lower part 115.

According to various embodiments of the present disclosure, the electronic device 100 may include a plurality of microphones, for example, three microphones 130*a*, 130*b*, and 130*c* thereat. The microphone 130 may be disposed at a predetermined distance away from the connector 118 and the touch key 120 in order to avoid (or reduce) the effects of electrical interference. According to an embodiment of the present disclosure, the microphone 130*a* may be disposed at a position spaced a predetermined distance away from the connector 119 on the lower part 115, for example, the right. Additionally, the microphone 130 may be disposed at a position spaced a predetermined distance away from the touch key 120 disposed at the front part 111. According to an embodiment of the present disclosure, the microphone 130*a* may be disposed at the right of the connector 118 and disposed at the lower part 115 and more to the outside than the region where the touch key 120 is disposed. According to various embodiments of the present disclosure, the microphone 130*a* may be disposed in a region of the lower part 115 between the connector 118 and the touch key 120. According to aspects of the disclosure, a microphone may be considered to be disposed at a particular wall of the electronic device (e.g., a sidewall, a top surface, a bottom surface, etc.) when the microphone is disposed on or otherwise coupled to the particular wall and/or when the microphone is adapted to receive sound through an opening in the particular wall. The microphone 130*b* may be disposed at a predetermined distance from the connector 118 and the touch key 121 in order to avoid (or reduce the effects of) electrical interference from the connector 118 and the touch key 121. According to an embodiment of the present disclosure, the microphone 130*a* may be disposed at the left spaced a predetermined distance away from the connector 118 on the lower part 115. According to an embodiment of the present disclosure, the microphone 130*b* may be disposed on a portion of the lower part 115, which is spaced a predetermined distance away from the touch key 121 disposed at the front part 111. According to various embodiments of the present disclosure, the microphone 130*b* may be disposed to the left of the connector 118 and disposed in the lower part 115, but closer to the left edge of the enclosure 110 than the touch key 121. According to various embodiments of the present disclosure, the microphone 130*b* may be disposed in a region of the lower part 115 between the connector 118 and the touch key 121.

The microphone 130*c* may be disposed at a position spaced a predetermined distance away from the audio jack 122 on the upper part 113. According to an embodiment of the present disclosure, the microphone 130*c* may be disposed at the right of the audio jack 122. Additionally, the microphone 130*c* may be disposed on a portion of the upper part 113, which is spaced a predetermined distance away from the receiver 117. Accordingly, the microphone 130*c* may be disposed at a predetermined point of the upper part 113 between the audio jack 122 and the receiver 117. The microphone 130*c*, for example, may be disposed in an edge area where the upper part 113 and the left part 116 are connected to each other.

The electronic device 100 may distinguish (for example, omni-directional beamforming) the positions (for example, up, down, left and right on the plane) of a narrator by simultaneously using the three microphones 130*a*, 130*b*, and 130*c* according to the kind (a type, a sort, a species, etc.) of an executed application. Additionally, since the electronic device 100 may capture audio data more clearly by using the microphones 130*a*, 130*b*, and 130*c*, it may have an improved call quality. The electronic device 100 may support a handset noise suppression function, a hands-free noise suppression function, a voice recording function (for example, a call sound recording function, an audio recording function, and an audio recording function during video recording), and a voice search function on the basis of at least one of the microphones 130*a*, 130*b*, and 130*c*.

According to various embodiments of the present disclosure, in relation to the handset noise suppression function, the electronic device may easily collect user audio data in a device grip state on the basis of the microphone 130*a* and the microphone 130*b*. For example, the electronic device 100 may improve functions such as noise cancellation or voice maintenance by improving the signal to noise ratio (SNR) for user audio data.

According to various embodiments of the present disclosure, in relation to the hands-free suppression function, the electronic device 100 may collect noise feature and speech feature information more clearly by using the three microphones 130*a*, 130*b*, and 130*c*. The availability of the microphones 130*a-c* may permit the electronic device 100 to perform support a narrator direction search and tracking function faster and more accurately. In addition, the availability of the microphones 130*a-c* may enable the electronic device 100 to cancel noise more efficiently thus producing improved audio quality. According to various embodiments of the present disclosure, in relation to the voice recording function, the electronic device 100 may improve beamforming for a fixed direction (for example, up or down) by using the three microphones 130*a*, 130*b*, and 130*c*. Additionally, may search for a more accurate narrator position as supporting beamforming for a plane by using the three microphones 130*a*, 130*b*, and 130*c*.

Table 1 illustrates a noise cancellation effect using two microphones and a noise cancellation effect using three microphones in a handset (HS) state (for example, a state of gripping the electronic device 100) according to various embodiments of the present invention.

TABLE 1

| HS | Pub | Drive | Pink | Music | Average | SNRI |
|---|---|---|---|---|---|---|
| 2MIC nose cancellation | −60.68 | −60.11 | −48.96 | −43.63 | −53.35 | 33.29 |
| 3MIC noise cancellation | −81.73 | −82.56 | −85.42 | −69.29 | −79.75 | 59.69 |
| Input noise | −21.68 | −18.71 | −22.12 | −17.74 | −20.06 | — |

As shown in Table 1, the electronic device 100 provides good performance improvements in comparison to instances in which two microphones are used in a handset state. For example, the electronic device 100 may improve about 26 dB performance relatively in comparison to a case of using two microphones.

Table 2 illustrates a noise cancellation effect using two microphones and a noise cancellation effect using three microphones in a hands-free (HF) state (for example, a state of mounting the electronic device 100) according to various embodiments of the present invention.

TABLE 2

| | SNR 5 dB | | | | |
|---|---|---|---|---|---|
| HF | Pub | Pink | Music | Average | SNRI |
| 2MIC nose cancellation | −44.24 | −72.53 | −42.23 | −53.00 | 20.30 |
| 3MIC nose cancellation | −76.2 | −75.24 | −72.03 | −74.49 | 41.79 |
| Input noise | −35.79 | −31.45 | −30.87 | −32.70 | — |

As shown in Table 2, the electronic device 100 provides about 19 dB performance improvement relatively in comparison to instances in which two microphones are used in a hands-free state.

Figure 2:
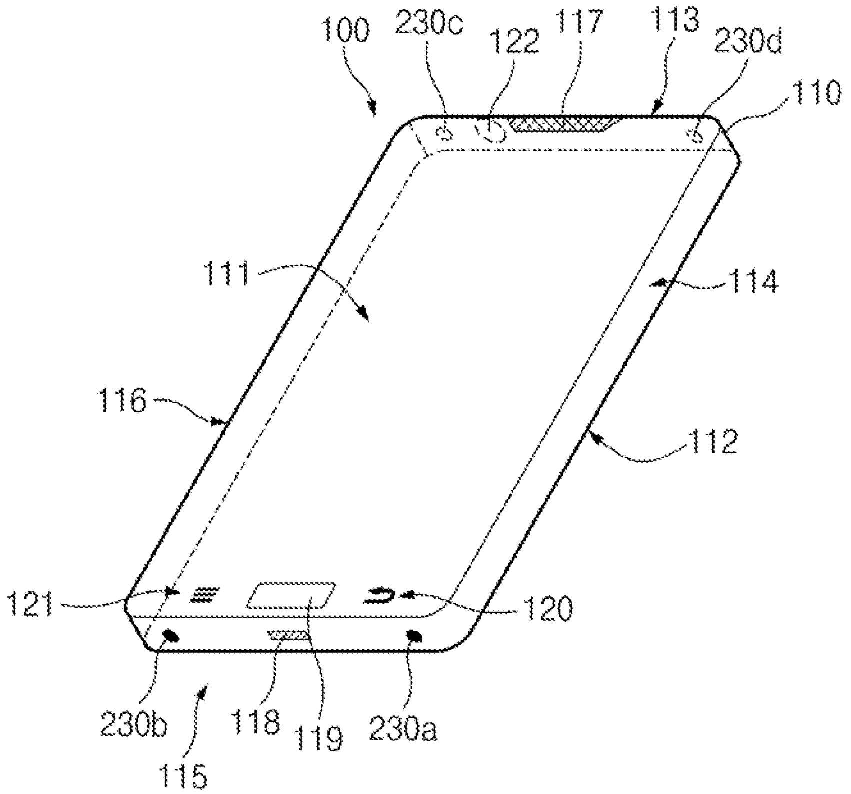
FIG. 2 is a diagram of an example of an electronic device including a plurality of microphones at its side part according to various embodiments of the present disclosure.

FIG. 2 is a diagram of an example of an electronic device including a plurality of microphones at its side part according to various embodiments of the present disclosure.

Referring to FIG. 2, an enclosure 110 of an electronic device 100 may include a front part 111, a rear part 112, an upper part 113, a right part 114, a lower part 115, and a left part 116. For example, a receiver 117, a home key 119, a touch key 120, and a touch key 121 may be disposed at the front part 111. For example, an audio jack 122 may be disposed at the upper part 113. A connector 118 may be disposed at the lower part 115. Additionally or alternatively, various components, for example, a power key, a volume key, and so on, may be further included in the electronic device 100.

According to various embodiments of the present disclosure, the electronic device 100 may include a plurality of microphones, for example, four microphones 230*a*, 230*b*, 230*c*, and 230*d*. The four microphones 230*a*, 230*b*, 230*c*, and 230*d*, for example, two thereof, may be disposed at two different parallel surfaces, as shown.

The microphone 230*a* may be disposed between the connector 118 and the touch key 120 on the lower part 115. Alternatively, the microphone 230*a* may be disposed to the right of the connector 118 and disposed at the lower part 115 and closer towards the right edge of the enclosure 110 than the touch key 121. The microphone 230*b* may be disposed between the connector 118 and the touch key 121 on the lower part 115. Alternatively, the microphone 230*b* may be disposed at the left of the connector 118 and disposed at the lower part 115 and closer to the left edge of the enclosure 110 than the touch key 121.

The microphone 230*c* may be disposed at the left of the audio jack 122 on the upper park 113. Alternatively, according to various embodiments of the present disclosure, the microphone 230*c* may be disposed between the audio jack 122 and the receiver 117 on the upper part 113. The microphone 230D may be disposed biased to the right of the upper part 113. For example, the microphone 230D may be more biased to the right outside than the receiver 117 on the upper part 113. According to various embodiments of the present disclosure, at least one of the microphone 230*c* and the microphone 230*d* may be disposed in an edge area where the upper part 113 and the right part 114, or the upper part 113 and the left part 116 are connected.

The electronic device 100 may simultaneously use at least two of the four microphones 230*a*, 230*b*, 230*c*, and 230*d* according to the kind (a type, a sort, a species, etc.) of an executed application. For example, the electronic device 100 may distinguish (e.g., by using omni-directional beamforming) the positions (for example, up, down, left and right relative to the electronic device 100) of a narrator by using the four microphones 230*a*, 230*b*, 230*c*, and 230*d*. The electronic device 100 may support a handset noise suppression function, a hands-free noise suppression function, a voice recording function, and a voice search function on the basis of at least one of the four microphones 230*a*, 230*b*, 230*c*, and 230*d*. The electronic device 100 using the four microphones 230*a*, 230*b*, 230*c*, and 230*d* may improve SNR by collecting improved noise features or speech features and based on this, may improve noise cancellation or voice maintenance gain. The electronic device 100 may perform a two-dimensional or three-dimensional beamforming by using the four microphones 230*a*, 230*b*, 230*c*, and 230*d*, thereby supporting an improved voice tracking function. The electronic device 100 may support more accurate direction detection in comparison to a case of using three microphones, as supporting a voice related function on the basis of the four microphones 230*a*, 230*b*, 230*c*, and 230*d*.

Figure 3A:
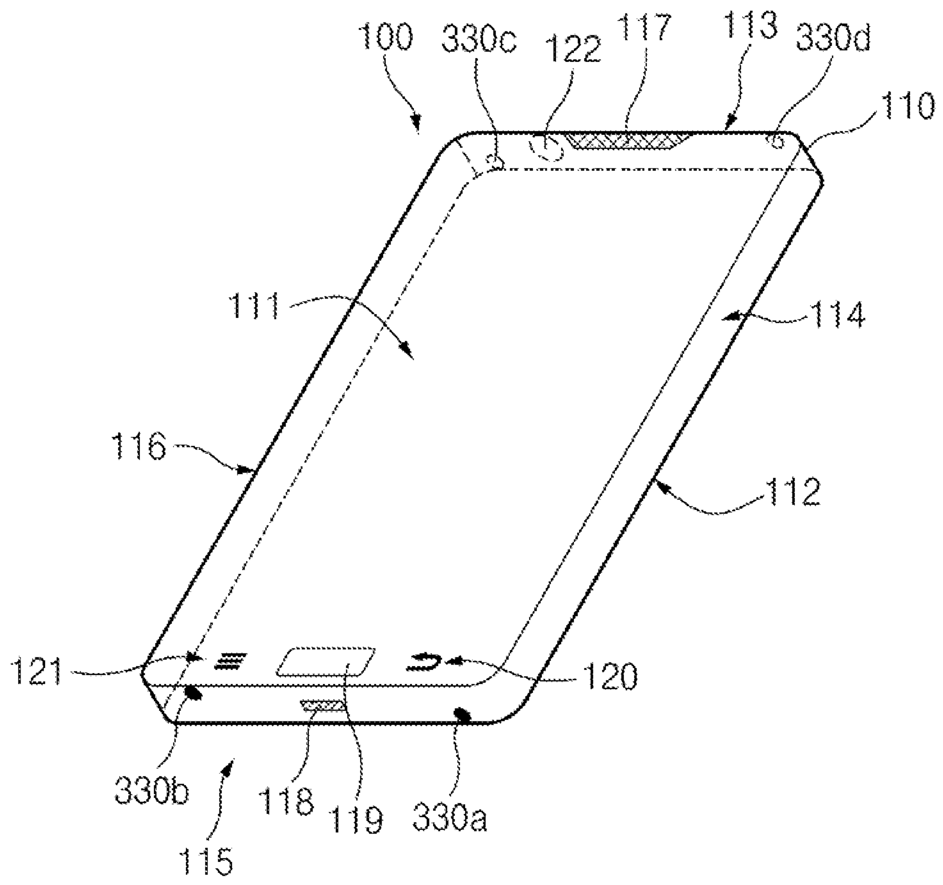
FIG. 3A is a diagram of an example of an electronic device, according to various embodiments of the present disclosure.
Figure 3B:
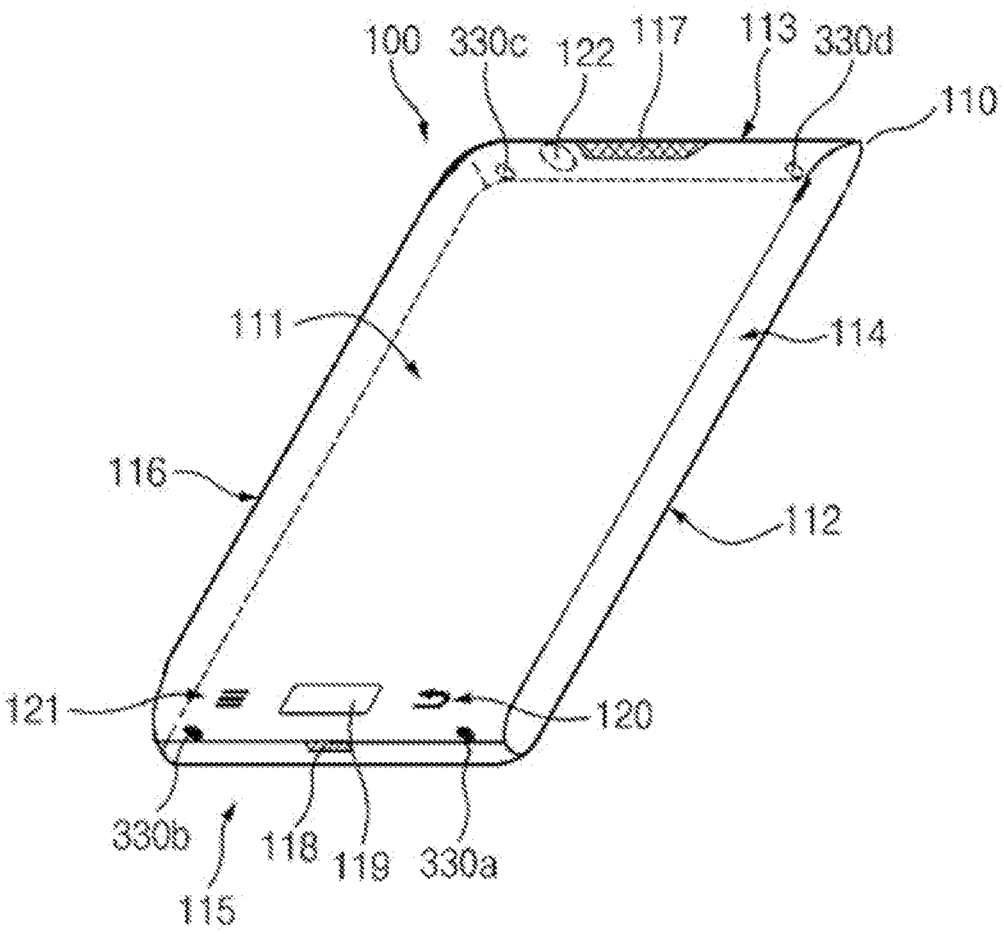
FIG. 3B is a diagram of an example of an electronic device, according to various embodiments of the present disclosure.

FIGS. 3A-B are diagrams of an example of an electronic device, according to various embodiments of the present disclosure. Referring to FIG. 3A, an enclosure 110 of an electronic device 100 may include a front part 111, a rear part 112, an upper part 113, a right part 114, a lower part 115, and a left part 116. For example, a receiver 117, a home key 119, a touch key 120, and a touch key 121 may be disposed at the front part 111. For example, an audio jack 122 may be disposed at the upper part 113. A connector 118 may be disposed at the lower part 115. Additionally or alternatively, various components, for example, a power key, a volume key, and so on, may be further included in the electronic device.

According to various embodiments of the present disclosure, the electronic device 100 may include a plurality of microphones, for example, four microphones 330*a*, 330*b*, 330*c*, and 330*d*. For example, the microphones 330*a-d* may be disposed on two different surfaces (for example, the upper part 113 or the lower part 115). According to an embodiment of the present disclosure, the microphones disposed on a given surface may be spaced out differently from the base (or the touchscreen) of the electronic device 110. For example, the microphones may be disposed to be offset from each other on the basis of a horizontal line (or a line parallel to a side part). Alternatively, according to various embodiments of the present disclosure, four microphones may be disposed in parallel on the same surface. For example, the microphones 330*a* and 330*b* disposed at the lower part 115 may be disposed in parallel on the basis of a horizontal line. Alternatively, the microphones 330*c* and 330*d* disposed at the upper part 113 may be disposed in parallel on the basis of a horizontal line.

The microphone 330*a* may be disposed between the connector 118 and the touch key 120 on the lower part 115. Alternatively, as shown in the drawing, the microphone 330*a* may be disposed to the right of the connector 118 and disposed at the lower part 115 and more to the outside than the region where the touch key 120 is disposed. According to various embodiments of the present disclosure, the microphone 330*a* may be biased towards a lower part that is close to the rear part 112 in the lower part 115. The microphone 330*b* may be disposed between the connector 118 and the touch key 121 on the lower part 115. Alternatively, as shown in the drawing, the microphone 330*b* may be disposed at the left of the connector 118 and disposed at the lower part 115 closer to the right edge of the electronic device 110 than the touch key 121. According to various embodiments of the present disclosure, the microphone 330*b* may be biased towards an upper part that is close to the front part 111 in the lower part 115.

The microphone 330*c* may be disposed at the left of the audio jack 122 on the upper park 113. Alternatively, the microphone 330*c* may be disposed between the audio jack 122 and the receiver 117 on the upper part 113. According to various embodiments of the present disclosure, the microphone 330*c* may be formed at the upper part 113 and disposed at a lower part that is close to the rear part 112. The microphone 330D may be biased towards the right of the upper part 113. For example, the microphone 330D may be disposed more biased to the right outside than the receiver 117 on the upper part 113. According to various embodiments of the present disclosure, the microphone 330*d* may be formed at the upper part 113 and disposed at an upper part that is close to the front part 111. According to various embodiments of the present disclosure, at least one of the microphone 330*c* and the microphone 330*d* may be disposed in an edge area where the upper part 113 and the right part 114, or the upper part 113 and the left part 116 are connected.

According to an embodiment of the present disclosure, the four microphones 330*a*, 330*b*, 330*c*, and 330*d* may be disposed in a reverse form. For example, the microphones 330*a* disposed at the lower part 115 may be biased towards an upper part and the microphone 330*b* may be biased towards a lower part. Additionally, the microphones 330*c* disposed at the upper part 113 may be biased towards an upper part and the microphone 330*d* may be biased towards a lower part.

According to various embodiments of the present disclosure, microphones biased towards an upper part may be disposed in an edge area where the lower part 115 and the front part 111, or the upper part 113 and the front part 111 are connected. Alternatively, microphones biased towards a lower part may be disposed in an edge area where the lower part 115 and the rear part 112, or the upper part 113 and the rear part 112 are connected.

The electronic device may perform beamforming for the front direction of the electronic device 100 by using microphones disposed in an upper direction (for example, an area close to a front part) at a curved side part and may perform beamforming for the rear direction of the electronic device 100 by using microphones disposed in a lower direction (for example, an area close to a rear part). The electronic device 100 may distinguish noise features and speech features more clearly by using the four microphones 330*a*, 330*b*, 330*c*, and 330*d* and may provide effects such as noise cancellation or voice maintenance. According to various embodiments of the present disclosure, the electronic device respectively perform beamforming to the front and rear directions of the electronic device 100, it is possible to provide audio zoom effects (for example, a function for collecting only audio from a sound source of a specific narrator or a specific direction or obtaining a relatively loud sound by assigning a high weight value). For example, the electronic device 100 may support an audio zoom effect that is obtained by tracking the direction of voice or sound in the front or rear direction of the electronic device 100 according to beamforming and collecting only a voice or sound in a desired direction according to a user setting or a device setting.

FIG. 3B is a view illustrating the appearance of an electronic device including a plurality of microphones disposed at a bent side part according to various embodiments of the present disclosure.

Referring to FIG. 3B, according to various embodiments of the present disclosure, at least one of an upper part 113 and a lower part 115 of the electronic device 100 may be formed round with a predetermined curvature. In this case, microphones disposed at the same surface among four microphones 330*a*, 330*b*, 330*c*, and 330*d* may be divided and disposed in the upper and lower directions of the upper part 113 or the lower part 115. Additionally, according to various embodiments of the present disclosure, the microphones 330*a* and 330*b* disposed at the lower part 115 may be disposed in parallel (for example, side-by-side relative to a horizontal line). Additionally, for example, the microphones 330*c* and 330*d* disposed at the upper part 113 may be disposed in parallel (for example, side-by-side relative to a horizontal line).

According to various embodiments of the present disclosure, the upper part 113 is prepared in a form of being bent with a predetermined curvature and the lower part 115 may be formed to be a flat surface. Alternatively, the lower part 115 is prepared in a form of being bent with a predetermined curvature and the upper part 113 may be formed to be a flat surface.

Figure 4:
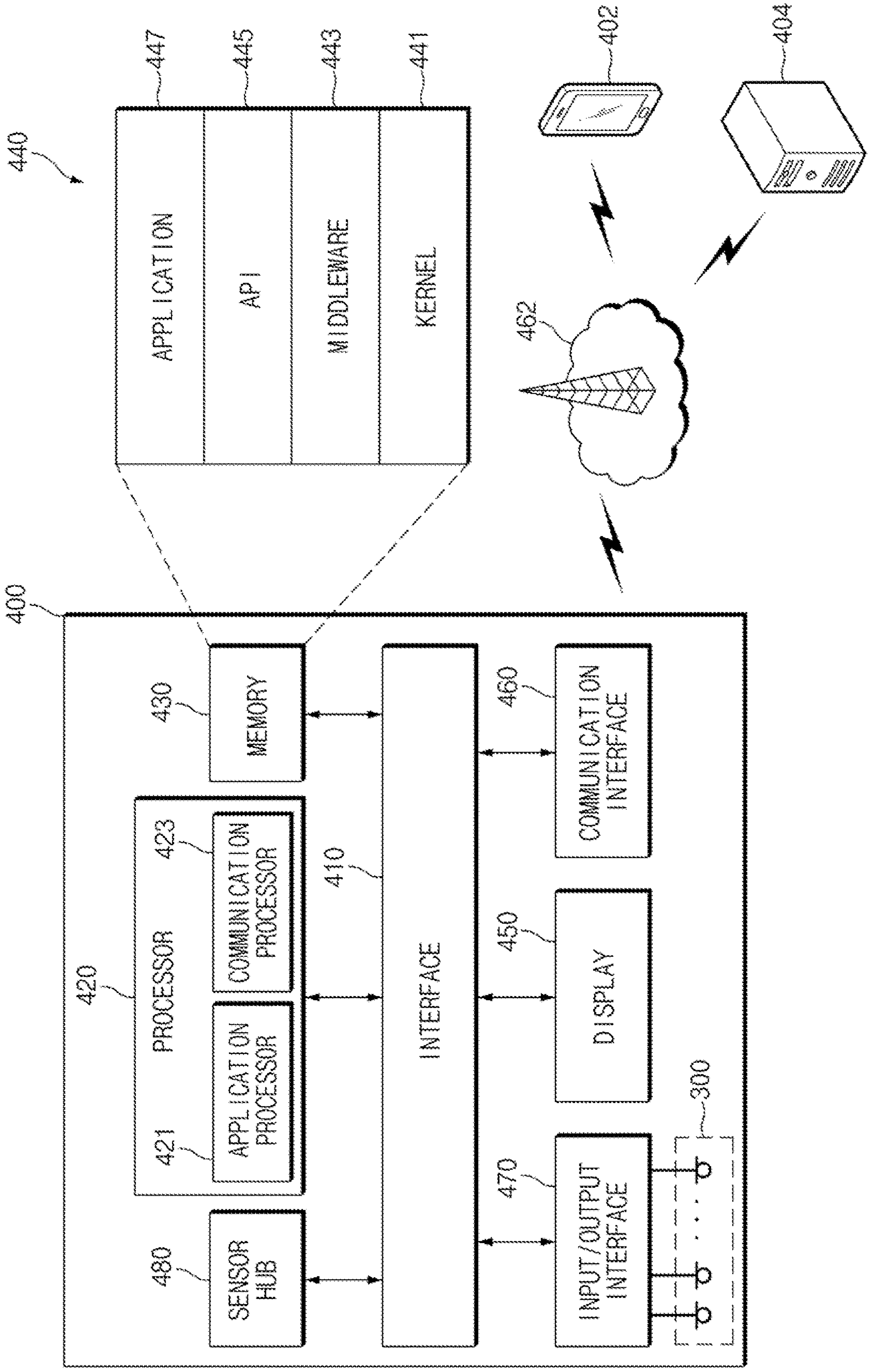
FIG. 4 is a diagram of an example of a network environment according to various embodiments of the present disclosure.

FIG. 4 is a diagram of an example of a network environment according to various embodiments of the present disclosure.

Referring to FIG. 4, the electronic device operating environment may include an electronic device 400, a network 162, an external electronic device 402, and a server device 404.

The electronic device 400 may include at least three microphones 300 and may activate a plurality of microphones according to an application operation. For example, the electronic device 400 may support a voice call function, a voice recording function, and a voice search function. In the case of the voice recording function, a general recording function and a direction specific narrator dialog recording function are distinguished and supported. Additionally, the electronic device 400 may allow an easy control for the plurality of microphones 300 that it supports an easy conversation recording or voice collection function according to a user need.

The network 462 may include telecommunications network, for example, at least one of internet, telephone network, and mobile communication network. The network 462 may support a communication channel establishment relating to communication service management of the electronic device 400. The electronic device 400 may establish a voice call channel or a video call channel with the external electronic device 402 through the network 462. According to an embodiment of the present disclosure, the network 462 may support a voice call or video call channel establishment and may transmit a call sound generated from audio data that three microphones collect or audio data that four microphones collect, to the other side electronic device.

The external electronic device 402 may be the same or different a kind (a type, a sort, a species, etc.) of the electronic device 400. The external electronic device 402 may transmit a call (for example, a voice call or a video call) connection request message to the electronic device 400 via the network 462 or may establish a communication channel to request message transmission. According to various embodiments of the present disclosure, the external electronic device 402 may include a plurality of microphones, similarly to the electronic device 400. The external electronic device 402 may collect audio data by activating a plurality of microphones in correspondence to a user manipulation or a setting of a call function application. Additionally, the external electronic device 402 may collect audio data by activating a larger number of microphones than before in correspondence to a user manipulation.

The server device 404 may include a group of one or more servers. According to various embodiments of the present disclosure, all or part of operations executed on the electronic device 400 may be executed on another one or more electronic devices (for example, the electronic device 102 or the server device 404). The server device 404 may establish a communication channel with the electronic device 400 or the external electronic device 402 in relation to communication service support. According to various embodiments of the present disclosure, the server device 404 may receive and store audio data (for example, a voice recording file) collected based on a plurality of microphones from the electronic device 400 or the external electronic device 402. The server device 404 may receive and store information on a recording environment while receiving a voice recording file. For example, the server device 404 may receive and store information on the number of microphones used in a voice recording environment. The server device 404 may provide a stored voice recording file in correspondence to a request of the electronic device 400 or the external electronic device 402.

According to an embodiment of the present disclosure, when the electronic device 400 performs a certain function or service automatically or by a request, it may request at least part of a function relating thereto from another device (for example, the external electronic device 402 or the server device 404) instead of or in addition to executing the function or service by itself. The other electronic devices (for example, the external electronic device 402 or the server device 404) may execute the requested function or an additional function and may deliver an execution result to the electronic device 400. The electronic device 400 may provide the requested function or service by processing the received result as it is or additionally. For this, for example, cloud computing, distributed computing, or client-server computing technology may be used.

The electronic device 400 may include an interface 410, a processor 420, a memory 430, an input/output interface 470, a display 450, and a communication interface 460. Additionally or alternatively, the electronic device 400 may include a sensor hub 480. According to an embodiment of the present disclosure, the electronic device 400 may omit at least one of the components or may additionally include a different component.

The interface 410, for example, may include a circuit for connecting the components 120 to 170 to each other and delivering a communication (for example, control message and/or data) between the components 120 to 170. For example, the interface 410 may receive an application execution input signal relating to at least one microphone operation among a plurality of microphones 300, from the input/output interface 470. The interface 410 may deliver a corresponding input signal to the input/output interface 470 in correspondence to a control of the processor 420. According to various embodiments of the present disclosure, the interface 410 may deliver audio data that the microphones 300 collect to the processor 420 while a voice recording function is performed. Alternatively, the interface 410 may transmit the collected audio data to the memory 430 in relation to storage.

The processor 420 may include any suitable a kind (a type, a sort, a species, etc.) of processing circuitry, such as one or more general-purpose processors (e.g., ARM-based processors), a Digital Signal Processor (DSP), a Programmable Logic Device (PLD), an Application-Specific Integrated Circuit (ASIC), a Field-Programmable Gate Array (FPGA), etc. The processor 420, for example, may execute calculation or data processing for control and/or communication of at least one another component of the electronic device 400. According to various embodiments of the present disclosure, the processor 420 may perform data processing or control signal processing relating to at least one application execution.

According to an embodiment of the present disclosure, the application processor 421 may activate at least part of the plurality of microphones 300 in correspondence to the kind (a type, a sort, a species, etc.) of an application whose execution is requested. For example, when the activation of a call function is requested, the application processor 421 may perform activate two microphones disposed at a lower part among the plurality of microphones 300. Additionally, when the activation of a voice recording function is requested, the application processor 421 may activate at least one microphone in correspondence to a voice recording function setting. During this operation, the application processor 421 may provide a microphone designation interface during the activation of a voice recording function and may adjust the number of activated microphones in correspondence to an input signal.

According to various embodiments of the present disclosure, the application processor 421 may differently support the kind (a type, a sort, a species, etc.) (for example, a single recording function, a narrator identification recording function, and a direction specific narrator identification recording function) of voice recording in correspondence to the number of activated microphones in relation to recording function execution. In the case of the direction specific narrator identification recording function, the application processor 421 may differently provide the number of distinguished directions in correspondence to the number of activated microphones. According to an embodiment of the present disclosure, if the activation of two microphones is set, the application processor 421 may distinguish two directions. If the activation of at least three microphones is set, the application processor 421 may distinguish three or more directions.

According to various embodiments of the present disclosure, the application processor 421 may control the number of activated microphones in relation to a voice search function execution. For example, the application processor 421 may activate at least one of the microphones 300. If an activated microphone designated execution language (for example, a term set for executing a voice search function) is obtained, the application processor 421 may execute a voice search function. When a voice search function is executed, the application processor 421 may process search word conversion for audio data obtained by activating a plurality of microphones (for example, two or three more microphones). The application processor 421 may perform search on the basis of the search word and output a result.

The communication processor 423 may process a function control relating to a communication function support of the electronic device 400. For example, the communication processor 423 may process a communication channel establishment with the external electronic device 400 or the server device 404. According to various embodiments of the present disclosure, the communication processor 423 may control the activation and operation of the microphones 300 in relation to a call function support when the application processor 421 is in a sleep state. According to various embodiments of the present disclosure, the communication processor 423 may adjust the number of activated microphones during call function support in correspondence to a user setting. For example, when a handset function is set during call function execution, the communication processor 423 may activate two microphones disposed at a lower part. When a hands-free function is set during call function execution, the communication processor 423 may activate at least three microphones.

The processor 420 (for example, the AP 421 or the CP 423) may include codec. The codec may process data conversion for audio data obtained from the plurality of microphones 300. The codec may transmit an inputted audio signal to a speaker. The codec may perform processing on an audio signal of a voice inputted from the microphones 300. The codec may convert audio signals of a voice received from a microphone into digital signals. Such codec may be provided in a chip separated from the processor 420. The codec may process at least one of a Direction of arrival (DOA) function, a Beamforming function, a Noise Suppression function, an active noise cancellation (ANC) function, and an Echo Cancellation function.

The sensor hub 480 may be a processor designed to allow relatively low power driving in comparison to the AP 421 or the CP 423. The sensor hub 480, for example may control an activation and operation of the microphones 300 in relation to a call function or a voice recording function. The sensor hub 480, for example, may be connected at least one sensor, activate necessary sensors according to the operation of the electronic device 400, and collect sensor information to provide it to the processor 420. According to various embodiments of the present disclosure, the sensor hub 480 may be prepared in a form of being included in the processor 420. When the application processor 421 is in a sleep state, the sensor hub 480 may receive a control for the activation of the microphones 300 and support a call function or a voice recording function. Codec may be disposed in the sensor hub 480.

The memory 430 may include any suitable type of volatile or non-volatile memory, such as Random Access Memory (RAM), Read-Only Memory (ROM), Network Accessible Storage (NAS), cloud storage, a Solid State Drive (SSD), etc. The memory 430 may include volatile and/or nonvolatile memory. The memory 430, for example, may store instructions or data relating to at least one another component of the electronic device 400. The memory 430 may store software and/or programs. The programs may include a kernel 441, a middleware 443, an application programming interface (API) 145, and/or an application program (or an application) 147. At least part of the kernel 441, the middleware 443, or the API 445 may be called an operating system (OS). The memory 430 may store setting information including the number and position of microphones to be activated by each application. The setting information, for example, may include information for activating two microphones disposed at a lower part during call function execution and information for activating at least three microphones during a recording function execution.

The kernel 441, for example, may control or manage system resources (for example, the interface 410, the processor 420, the memory 430, and so on) used for performing operations or functions implemented in other programs (for example, the middleware 443, the API 445, or the application program 447). Additionally, the kernel 441 may provide an interface for controlling or managing system resources by accessing an individual component of the electronic device 400 from the middleware 443, the API 445, or the application program 447. According to an embodiment of the present disclosure, the kernel 441 may provide an interface for controlling or operating system resources necessary for operations of the microphones 300 in relation to a call function or a voice recording function.

The middleware 443, for example, may serve as an intermediary role for exchanging data as the API 445 or the application program 447 communicates with the kernel 441. Additionally, in relation to job requests received from the application program 447, the middleware 443, for example, may perform a control (for example, scheduling or load balancing) for the job requests by using a method of assigning a priority for using a system resource (for example, the interface 410, the processor 420, the memory 430, and so on) of the electronic device 400 to at least one application program among the application programs 447. For example, the middleware 443 may perform a control on the selection of microphones to be activated in correspondence to the activation of a call function request, the power supply of corresponding microphones, and the processing of collected audio data.

The API 445, as an interface for allowing the application 447 to control a function provided from the kernel 441 or the middleware 443, may include at least one interface or function (for example, an instruction) for file control, window control, image processing, or character control. According to an embodiment of the present disclosure, the API 445 may include a call function related API and a voice recording function related API.

The application 447 may include various applications supported by the electronic device 400. For example, the application 447 may include a data communication-related web surfing function application, a content streaming application, and a voice search function application. According to the execution of the application 447, the electronic device 400 may support a user function. Accordingly, at least one function provided by the application 447 may be limited in correspondence to a control of the application processor 421 or the communication processor 423 or the sensor hub 480.

According to an embodiment of the present disclosure, the application 447 may include a call function application, a voice recording function application, and a voice search function application. Each application may include a setting for activating at least one microphone disposed at a specified position in correspondence to an execution timing or an execution manner and a processing function setting for audio data that set microphones obtain.

The input/output interface 470, for example, may serve as an interface for delivering instructions or data inputted by a user or another external device to another component(s) of the electronic device 400. Additionally, the input/output interface 470 may output instructions or data received from another component(s) of the electronic device 400 to a user or another external device.

According to an embodiment of the present disclosure, the input/output interface 470 may include microphones 300. The plurality of microphones 300, as described with reference to FIGS. 1 to 3, may be disposed at one side of the enclosure 110 to perform audio data collection. Audio data that the microphones 300 collect may be delivered to the processor 420 or the sensor hub 480.

The display 450, for example, may include a liquid crystal display (LCD), a light-emitting diode (LED) display, an organic light-emitting diode (OLED) display, a microelectromechanical systems (MEMS) display, or an electronic paper display. The display 450 may display various content (for example, text, image, video, icon, symbol, and so on) to a user. The display 450 may include a touch screen, and for example, may receive a touch, gesture, proximity, or hovering input by using an electronic pen or a user's body part.

According to various embodiments of the present disclosure, the display 450 outputs the activation of a call function related screen, the activation of a voice recording function related screen, and a voice search function execution related screen. The display 450 may output an indication of the number of microphones that are activated while a telephone function is executed. The display 450 may output information on a direction specific narrator identification during voice recording function execution. The display 450 may provide an interface for performing an activation control of microphones in relation to a voice search function execution.

The communication interface 460, for example, may set communication between the electronic device 400 and an external device (for example, the external electronic device 402 or the server device 404). For example, the communication interface 460 may communicate with an external device (for example, the external electronic device 402 or the server device 404) in connection to the network 462 through wireless communication or wired communication. The wireless communication may use LTE, LTE-A, CDMA, WCDMA, UMTS, WiBro, or GSM as a cellular communication protocol, for example. Additionally, the wireless communication may include a communication method based on a Bluetooth communication module, a WiFi direct communication module, and so on. The wired communication, for example, may include at least one of universal serial bus (USB), high definition multimedia interface (HDMI), recommended standard 232 (RS-232), and plain old telephone service (POTS). The communication interface 460 may establish a communication channel with the external electronic device 402 during call function execution. The communication interface 460 may transmit audio data that the microphones 300 obtain to the external electronic device 402. The communication interface 460 may deliver an inputted search word to the server device 404 during voice search function execution. The communication interface 460 may receive a search result provided from the server device 404.

As mentioned above, according to various embodiments of the present disclosure, an electronic device may include at least three microphones disposed on at least another two surfaces; and a processor configured to control activation states of the microphones in correspondence to a type of an application and an arrangement position of the microphones.

According to various embodiments of the present disclosure, the microphones may include: a first microphone and a second microphone disposed at a lower part connected to a lower side among side parts connected to a front part with reference to the front part; and a third microphone disposed at an upper part connected to an upper side of the front part.

According to various embodiments of the present disclosure, the microphones may include: a first microphone and a second microphone disposed at a lower part connected to a lower side among side parts connected to a front part with reference to the front part; and a third microphone and a fourth microphone disposed at an upper part connected to an upper side of the front part.

According to various embodiments of the present disclosure, at least one of the first microphone and the second microphone, and the third microphone and the fourth microphone may be arranged to be offset from each other in the same surface.

According to various embodiments of the present disclosure, the microphones may include: a first microphone disposed at a lower part connected to a lower side among side parts connected to a front part with reference to the front part, and a second microphone and a third microphone disposed at an upper part connected to an upper side of the front part; a first microphone disposed at a lower part connected to a lower side among side parts connected to a front part with reference to the front part, a second microphone disposed at an upper part connected to an upper side of the front part, and a third microphone disposed at one side of the front part; or a first microphone disposed at a lower part connected to a lower side among side parts connected to a front part with reference to the front part, a second microphone disposed at an upper part connected to an upper side of the front part, and a third microphone disposed at one side of a rear part facing the front part.

According to various embodiments of the present disclosure, the microphones may include: a first microphone and a second microphone disposed at a lower part connected to a lower side among side parts connected to a front part with reference to the front part, a third microphone disposed at one side of the front part, and a fourth microphone disposed at a rear part facing the front part; a first microphone and a second microphone disposed at a lower part connected to a lower side among side parts connected to a front part with reference to the front part, a third microphone disposed at an upper part connected to an upper side of the front part, and a fourth microphone disposed at a rear part facing the front part; or a first microphone and a second microphone disposed at a lower part connected to a lower side among side parts connected to a front part with reference to the front part, a third microphone disposed at an upper part connected to an upper side of the front part, and a fourth microphone disposed at one side of the front part.

According to various embodiments of the present disclosure, when executing an application relating to an audio zoom function support, the processor may be set to activate a microphone disposed at a front part and a microphone disposed at a rear part, activate a microphone disposed at a front part and a microphone disposed at an upper part, or activate a microphone disposed at a front part, a microphone disposed at an upper part, and a microphone disposed at a rear part.

According to various embodiments of the present disclosure, when executing an application relating to an active noise cancellation function support, the processor may be set to activate a microphone disposed at an upper part and a microphone disposed at a front part, or activate a microphone disposed at a front part and a microphone disposed at a rear part, or activate a microphone disposed at an upper part and a microphone disposed at a rear part.

According to various embodiments of the present disclosure, when executing an application relating to a support of a handset noise suppression function, a hands-free noise suppression function, or an echo cancellation function, the processor is set to activate a plurality of microphones disposed at a lower part among side parts connected to a front part with reference to the front part and a microphone disposed at an upper part, or activate a plurality of microphones disposed at an upper part and a microphone disposed at a lower part.

According to various embodiments of the present disclosure, the processor may be set to output an interface for generating an input signal that activates or deactivates at least one microphone during the application execution.

According to various embodiments of the present disclosure, the processor may differently process the number of distinct directions in correspondence with the number of activated microphones.

Figure 5:
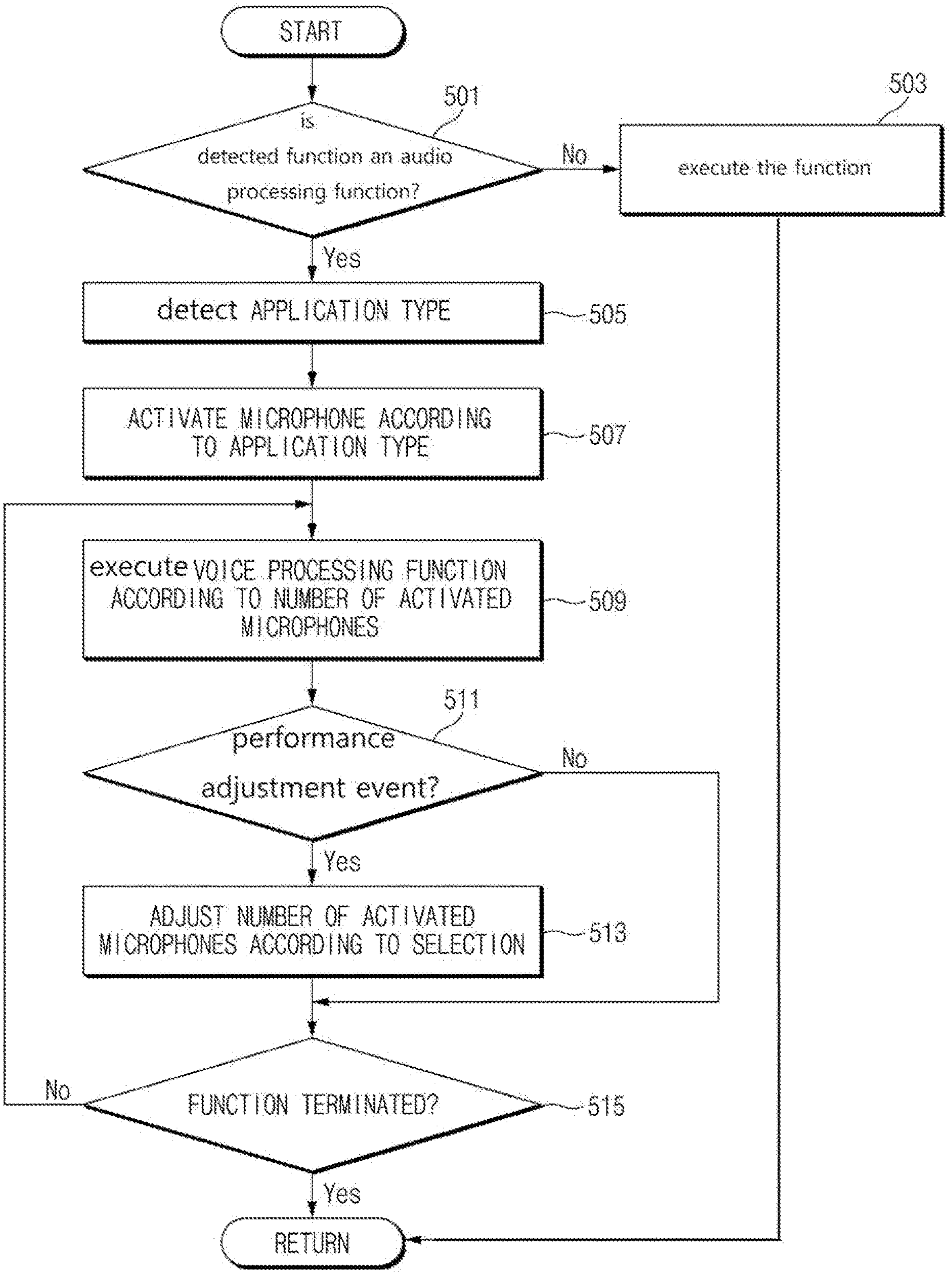
FIG. 5 is a flowchart of an example of a process according to various embodiments of the present disclosure.

FIG. 5 is a flowchart of an example of a process according to various embodiments of the present disclosure.

In operation 501 when an event occurs, the processor 420 may detect whether the event relates to an audio processing function activation. When the event relates to an audio processing function, the processor 420 may provide an icon or menu relating to an audio processing function (for example, a call function, a voice recording function, a voice search function, and so on). If the event does not relate to an audio processing function activation, the processor 420 may execute the function at operation 503, as shown. For example, the processor 420 may a gallery function, a content execution function, and a broadcast reception function.

If the event relates to an audio processing function, the processor 420 may detect the type of the application that generated the event, in operation 505. For example, the processor 420 may determine whether the application is a call function application, a voice recording function application, or a voice search function application.

In operation 507, a microphone activation may be controlled according to the application type. For example, the processor 420 may determine the number or positions of microphones to be activated in response to the event, based on the application type. According to an embodiment of the present disclosure, when the application is a telephony application, the processor 420 may activate a plurality of microphones disposed at the same surface of a lower part.

Alternatively, when the application is a voice recording application, the processor 420 may activate a plurality of microphones disposed at a lower part or an upper part with reference to the front of an electronic device.

Once the microphones are activated, in operation 509, the processor 420 may execute a voice processing function according to the number of the activated microphones. Additionally, the processor 420 may execute a voice processing function according to the positions of the activated microphones. For example, when two microphones are activated, the processor 420 may execute a noise suppression function and a beamforming function that is designed for use with a microphone array consisting of two microphones. When three microphones are activated, the processors 420 may execute a beamforming and direction separation algorithm that is designed for use with a microphone array consisting of three microphones. When four microphones are activated (for example, microphones are disposed at the front or rear), the processor 420 may perform three-dimensional beamforming and process more refined direction separation.

According to various embodiments of the present disclosure, the processor 420 may execute at least one of a forward type ANC function, a backward type ANC function, and an ANC function of a hybrid type combining a forward type and a backward type on the basis of at least one of a microphone disposed at a front part, a microphone disposed at a rear part, and a microphone disposed at an upper part.

In operation 511, the processor 420 may detect whether a performance adjustment event occurs. More specifically, the processor 420 may present on the display 450 an interface for instructing a microphone performance adjustment and generate the event when an input is received to the interface. In operation 513, when the performance adjustment event occurs, the processor 420 may adjust the number of microphones that are being used according to the type of the event. For example, when a first type of performance adjustment event occurs, the processor 420 may reduce the number of activated microphones. As another example, when a second type of performance adjustment event occurs, the processor 420 may increase the number of activated microphones. If a performance adjustment related event does not occur, the application processor 421 may skip operation 513.

In operation 515, the processor 420 may detect whether an event relating to function termination occurs. If there is no function termination related event, the processor 420 may branch into operation 509 and perform subsequent operations again. If a function termination related event occurs, the processor 420 may terminate a microphone related function and return to a set function screen (for example, a home screen) or the screen of a function executed right before an audio processing function execution. Alternatively, the processor 420 may control a sleep state shift.

As mentioned above, according to various embodiments of the present disclosure, an operating method of an electronic device may include: detecting a type of an application requested for execution; and separately processing activation states of microphones in correspondence to the type of the application and an arrangement position of the microphones.

According to various embodiments of the present disclosure, the separately processing of the activation states may include, when an application relating to an active noise cancellation function support is executed: activating a microphone disposed at an upper part and a microphone disposed at a front part; activating a microphone disposed at a front part and a microphone disposed at a rear part; or activating a microphone disposed at an upper part and a microphone disposed at a rear part.

According to various embodiments of the present disclosure, the separately processing of the activation states may include, when an application relating to an audio zoom function support is executed; activating a microphone disposed at a front part and a microphone disposed at a rear part; activating a microphone disposed at a front part and a microphone disposed at an upper part; or activating a microphone disposed at a front part, a microphone disposed at an upper part, and a microphone disposed at a rear part.

According to various embodiments of the present disclosure, the separately processing of the activation states may include, when an application relating to a support of a handset noise suppression function, a hands-free noise suppression function, or an echo cancellation function is executed; activating a plurality of microphones disposed at a lower part among side parts connected to a front part with reference to the front part and a microphone disposed at an upper part; or activating a plurality of microphones disposed at an upper part and a microphone disposed at a lower part.

According to various embodiments of the present disclosure, the method may further include outputting an interface for generating an input signal that activates or deactivates at least one microphone during the application execution.

According to various embodiments of the present disclosure, the method may further include differently processing the number of distinct directions in correspondence to the number of activated microphones.

According to various embodiments of the present disclosure, the method may further include: increasing the number of distinct directions as the number of the activated microphones is increased; and reducing the number of distinct directions as the number of the activated microphones is reduced.

According to various embodiments of the present disclosure, the method may further include displaying information corresponding to a distinguished direction according to an audio data collection.

According to various embodiments of the present disclosure, the microphones may include: a first microphone and a second microphone disposed at a lower part connected to a lower side among side parts connected to a front part with reference to the front part; and a third microphone disposed at an upper part connected to an upper side of the front part.

According to various embodiments of the present disclosure, the microphones may include: a first microphone and a second microphone disposed at a lower part connected to a lower side among side parts connected to a front part with reference to the front part; and a third microphone and a fourth microphone disposed at an upper part connected to an upper side of the front part.

According to various embodiments of the present disclosure, at least one of the first microphone and the second microphone, and the third microphone and the fourth microphone may be arranged to be offset from each other in the same surface.

Figure 6A:
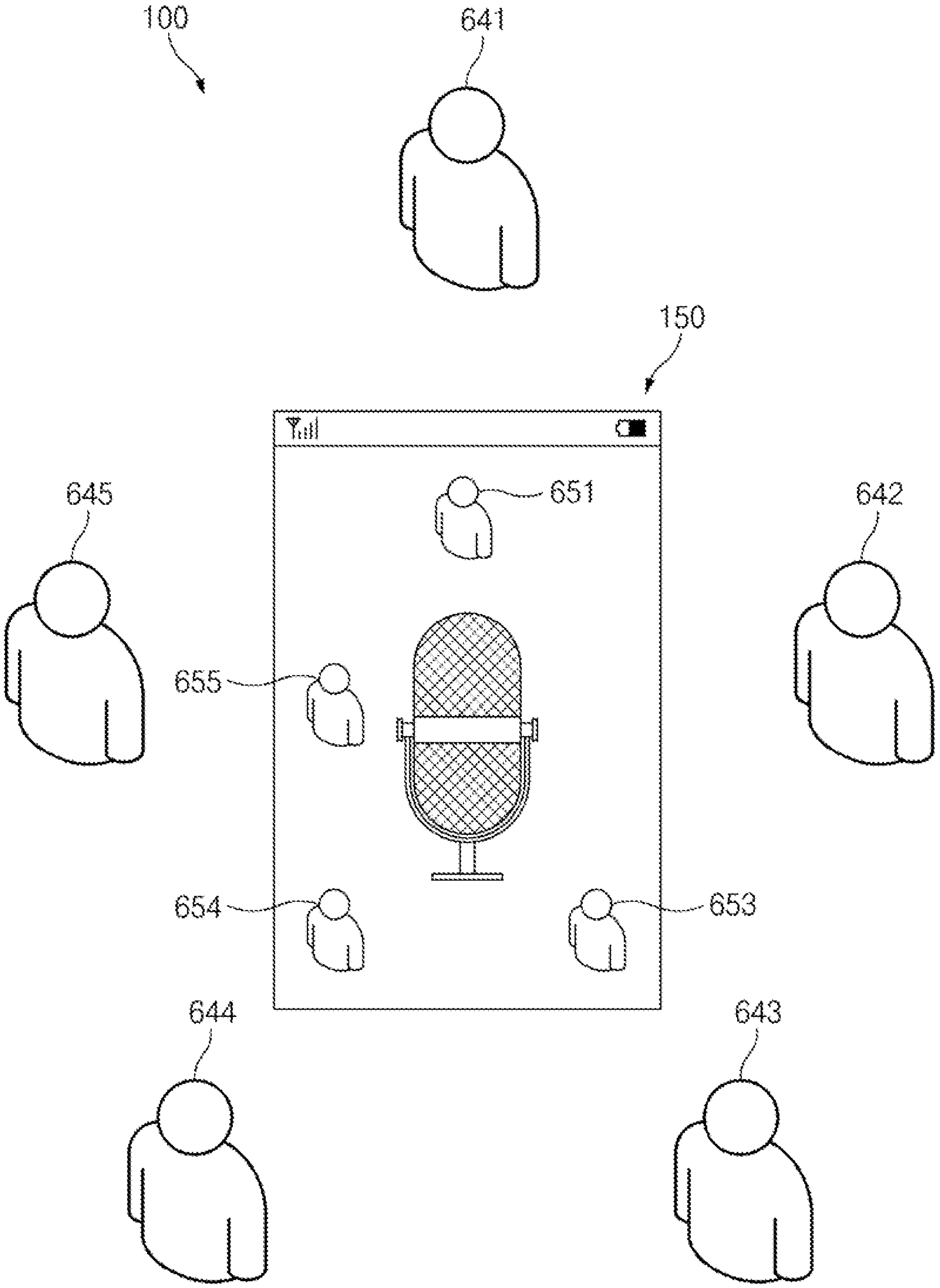
FIG. 6A is a diagram of an example of a user interface according to various embodiments of the present disclosure.

FIG. 6A is a diagram of an example of a user interface according to various embodiments of the present disclosure.

Referring to FIG. 6A, the electronic device 100 (or the electronic device 400) may perform a voice recording function execution. In relation to this, the electronic device 100 may include a plurality of microphones (for example, three microphones (for example, a plurality of microphones are disposed at the same surface and one microphone is disposed at another surface) or four microphones (for example, a plurality of microphones are disposed at the same surface and a plurality of microphones are disposed at another surface)). When a voice recording function execution is requested, the electronic device 100 may activate three or four microphones according to a setting.

The electronic device 100 may display a screen relating to a voice recording function execution to the display 150. In operation, the electronic device 100 may determine the direction from which a user's voice is coming at the device and may display an indication of the direction. According to an embodiment of the present disclosure, when a first narrator 641 speaks for a specified time, the electronic device 100 may record the voice of the narrator 641 while also displaying a direction icon 651 identifying the location of the narrator 641 relative to the display 150. In the same manner, when a narrator 643 speaks for a specified time, the electronic device 100 may display a direction icon 653 identifying the location of the narrator 643 relative to the electronic device while also recording the voice of narrator 643. Additionally, the electronic device 100 may display a direction icon 654 while recording a voice relating to a narrator 644. The electronic device 100 may display a direction icon 655 while recording a voice relating to a narrator 645. According to various embodiments of the present disclosure, if the speaker 643 does not speak at all or does not speak for a specified time, the electronic device 100 may not display an indication of the position of the narrator 643 and/or hide an indication of the position of the narrator 643 if it is already on display.

According to various embodiments of the present disclosure, any of the icons 651-655 may be displayed only temporarily while the icon's respective narrator is speaking. For example, while the narrator 641 speaks, the electronic device 100 may only display the direction icon 651 on the display 150. According to various embodiments of the present disclosure, the electronic device 100 may simultaneously display a different icon for each available narrator, while also highlighting the icon corresponding to the narrator who is currently speaking. The highlighting may include at least one of changing at least one of the color and form of a direction icon. For example, the electronic device 100 may display the direction icon 651, a direction icon 653, a direction icon 654, and a direction icon 655 in correspondence to the speeches of corresponding narrators. In order to perform direction separation, the electronic device 100 may maintain a direction icon displayed once until the termination of a recording function. Additionally or alternatively, when the narrator 643 speaks, the electronic device 100 may change at least one of the color and form of the direction icon 653 until the narrator 643 finishes a speech.

According to various embodiments of the present disclosure, the electronic device 100 may also store a change for direction icons in relation to the voice recording function. Accordingly, a user may view information identifying the seat arrangement (e.g., positions) of narrators (or other sound sources) for voice recording obtained from a specific conference, through direction icons. Additionally, when a playback for a corresponding voice recording file is requested, the electronic device 100 may display a change of direction icons while playing an entire recording file. Additionally, when a playback for a corresponding voice recording file is requested, the electronic device 100 may provide a screen interface including direction icons. When a corresponding direction icon is selected, the electronic device 100 may play only information that a narrator corresponding to a direction icon speaks.

Figure 6B:
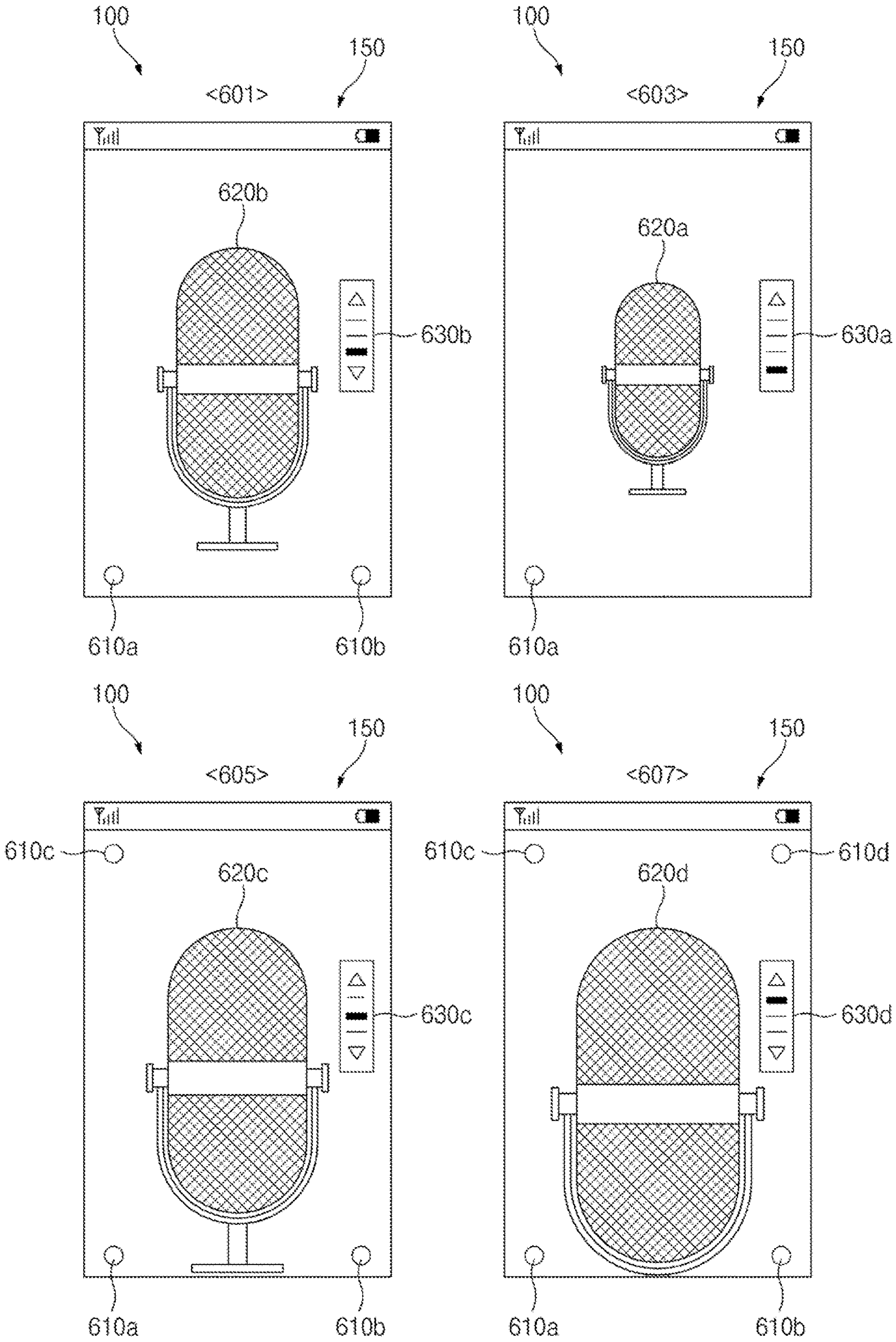
FIG. 6B is a diagram of an example of a user interface according to various embodiments of the present disclosure

FIG. 6B is a diagram of an example of a user interface, according to various embodiments of the present disclosure.

Referring to FIG. 6B, the electronic device 100 (or the electronic device 400) may provide a microphone control interface in an application execution situation relating to audio processing such as a call function, a voice recording function, and a voice search function. For example, when a request relating to a voice recording function execution occurs, or an event relating a microphone setting control occurs, the electronic device 100 may display a microphone image 620*b* and may display a microphone performance adjustment button 630*b* to the display 150, as shown in screen 401. The microphone performance adjustment button 630*b* may include at least one of text and image corresponding to a current microphone setting state. The electronic device 100 may display a microphone indicator 610*a* and a microphone indicator 610*b* in correspondence with the number and positions of currently running microphones. The microphone indicator 610*a* and the microphone indicator 610*b* may be displayed at positions on the display screen that are associated with the microphone's respective physical locations. For example, any of the indicators 610*a-b* may be displayed at a location on the display screen 150 under which the indicator's respective microphone is mounted.

According to various embodiments of the present disclosure, the electronic device 100 may adjust microphone performance downwardly in correspondence to the manipulation of the microphone performance adjustment button 630*b*. When the microphone performance is adjusted downwardly, the number of microphones that are currently used to record audio is decreased. Correspondingly, the electronic device 100, as shown in screen 603, may display a microphone image 620*a* and a microphone performance adjustment button 630*a*. The microphone performance adjustment button 630*a* may include a text or image corresponding to a downward adjusted state. Additionally, the electronic device 100 may display a microphone indicator 610*a* corresponding to a first microphone activation in correspondence to a downward performance.

According to various embodiments of the present disclosure, the electronic device 100 may adjust microphone performance upwardly in correspondence to the manipulation of the microphone performance adjustment button 630*b*. When the microphone performance is adjusted upwardly, the number of microphones that are currently used to record audio is increased. Correspondingly, the electronic device 100, as shown in screen 605, may display a microphone image 620*c* and a microphone performance adjustment button 630*c*. The microphone performance adjustment button 630*c* may include a text or image corresponding to an upward adjusted state. Additionally, the electronic device 100 may display the activation states (e.g., an indication of whether one or more of the microphones 630*a-c* is current being used to sample sound) of the microphone indicator 610*a*, the microphone indicator 610*b*, and the microphone indicator 610*c* in correspondence to an upward performance. The microphone indicator 610*a*, the microphone indicator 610*b*, and the microphone indicator 610*c* may correspond to the positions of microphones disposed in a device's enclosure.

According to various embodiments of the present disclosure, the electronic device 100 may additionally adjust microphone performance upwardly in correspondence to the manipulation of the microphone performance adjustment button 630*c*. Correspondingly, the electronic device 100, as shown in screen 607, may display a microphone image 620*d* and a microphone performance adjustment button 630*d*. The microphone performance adjustment button 630*d* may include a text or image corresponding to an additionally upward adjusted state. Additionally, the electronic device 100 may display the microphone indicator 610*a*, the microphone indicator 610*b*, the microphone indicator 610*c*, and the microphone indicator 610*d* in correspondence to activated microphones. The microphone indicator 610*a*, the microphone indicator 610*b*, the microphone indicator 610*c*, and the microphone indicator 610*d* may correspond to the positions of microphones disposed in the device's enclosure.

According to various embodiments of the present disclosure, the screen 601 may be a screen corresponding to an automatically set state in relation to a voice recording function execution. Accordingly, when a setting is changed, during a voice recording function execution, a screen, such as the screen 603, the screen 605, or the screen 607 may be provided when an application execution request is provided.

Figure 7:
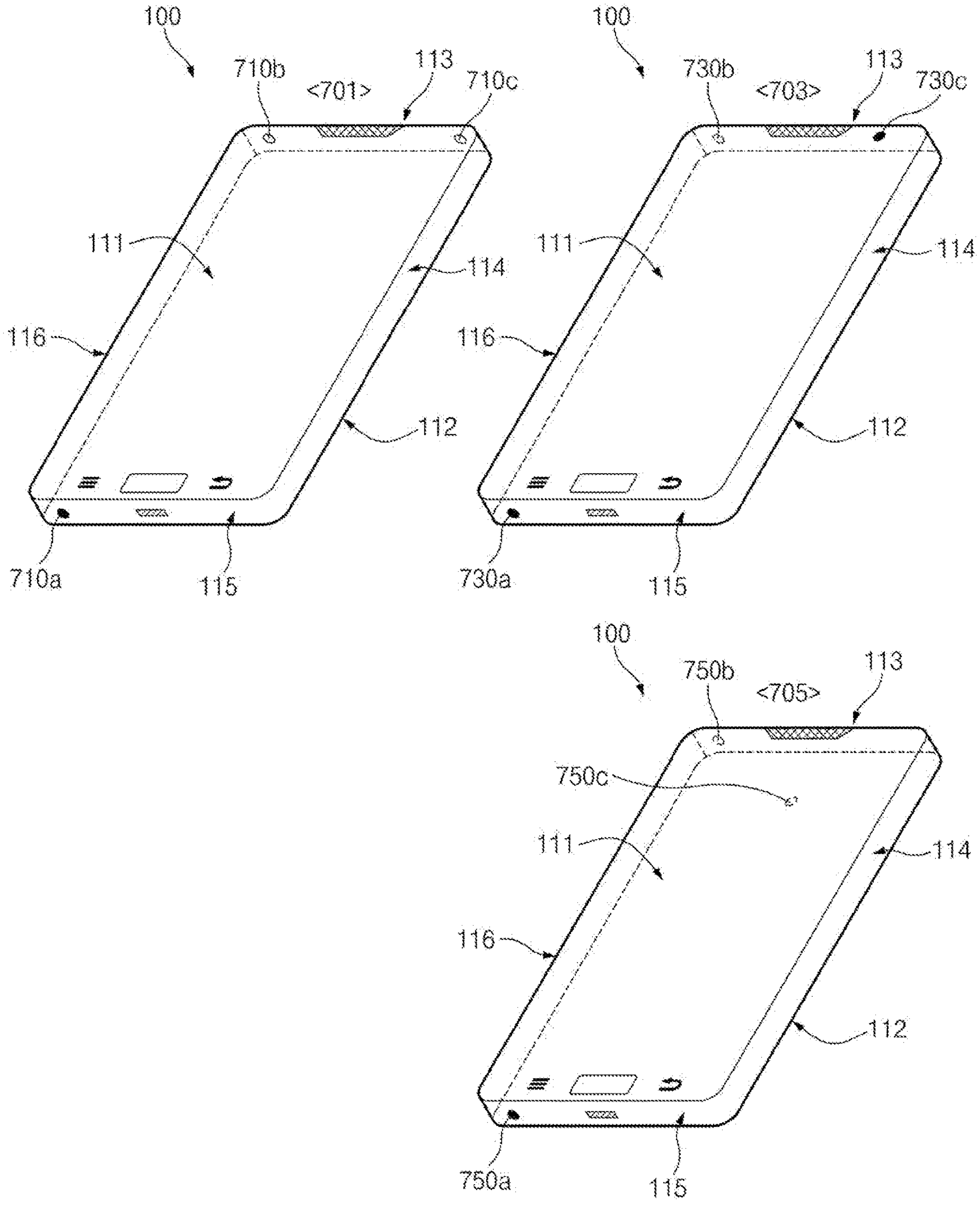
FIG. 7 is a diagram of an example of an electronic device including three microphones according to various embodiments of the present disclosure.

FIG. 7 is a diagram of an example of an electronic device including three microphones according to various embodiments of the present disclosure.

Referring to FIG. 7, an electronic device 100 (or an electronic device 400) may include a front part 111, a rear part 112, an upper part 113, a right part 114, a lower part 115, and a left part 116. The electronic device 100, as shown in a state 701, may include an enclosure in which a microphone 710*a* is disposed at the lower part 115 and a microphone 710*b* and a microphone 710*c* are disposed at the upper part 113. The microphone 710*a*, for example, may be biased towards the left of the lower part 115. The microphone 710*b* may be biased towards the left of the upper part 113. The microphone 710*c* may be biased towards the right of the upper part 113. The electronic device 100 having an arrangement of the microphones shown in the state 701 may activate the three microphones 710*a*, 710*b*, and 710*c* in order in order to perform a noise suppression function and a voice recording function in a hands-free state.

According to various embodiments of the present disclosure, as shown in a state 703, in relation to the electronic device 100, the microphone 730*a* may be disposed at the lower part 115, the microphone 730*b* may be disposed at the upper part 113, and the microphone 730*c* may be disposed at the front part 111. The microphone 730*a* may be biased towards the left of the lower part 115. The microphone 730*b* may be biased towards the left of the upper part 113. The microphone 730*c* may be biased towards the upper right of the front part 111. The electronic device 100 having an arrangement of the microphones shown in the state 703 may activate the three microphones 730*a*, 730*b*, and 730*c* in order to perform a noise suppression function and a voice recording function in a hands-free state. Additionally, the electronic device 100 may activate the microphones 730*b* and 730*c* in relation to an active noise cancellation (ANC) function support or may perform an ANC function on the basis of audio data obtained from the microphones 730*b* and 730*c*. The electronic device 100 having an arrangement of the microphones shown in the state 703 may easily collect information on noise features and speech features and based on this, may use beamforming to perform noise cancellation. Additionally, an electronic device may further separate a narrator direction (for example, at least three directions) on the basis of beamforming for a plane in a voice recording function. Alternatively, the electronic device 100 may apply an ANC function in a backward method or a hybrid method on the basis of the microphone 730*c* disposed at the front part 111 and the microphone 730*c* disposed at the upper part 113.

According to various embodiments of the present disclosure, as shown in a state 705, the electronic device 100 may include the microphone 750*a* disposed at the lower part 115, the microphone 750*b* disposed at the upper part 113, and the microphone 750*c* disposed at the rear part 112. The microphone 750*a* may be biased towards the left of the lower part 115. The microphone 750*b* may be biased towards the left of the upper part 113. The microphone 750*c* may be disposed at the upper center of the rear part 112. The electronic device 100 may support noise suppression in a handset state (for example, noise suppression using the microphone 750*b* disposed at the upper part 113 and the microphone 750*c* disposed at the rear part 112), noise suppression in a hands-free state (for example, feature extraction, beamforming, and noise cancellation using three microphones), and direction separation in a voice recording function (for example, a voice tracking function and noise cancellation during voice tracking by supporting three-dimensional beamforming on the basis of the microphone 750*c* disposed at the rear part 112). Additionally or alternatively, the electronic device 100 may perform a voice or narrator direction tracking and capture and audio zoom function in a capturing direction on the basis of the three microphones 750*a*, 750*b*, and 750*c* during video capturing.

Figure 8:
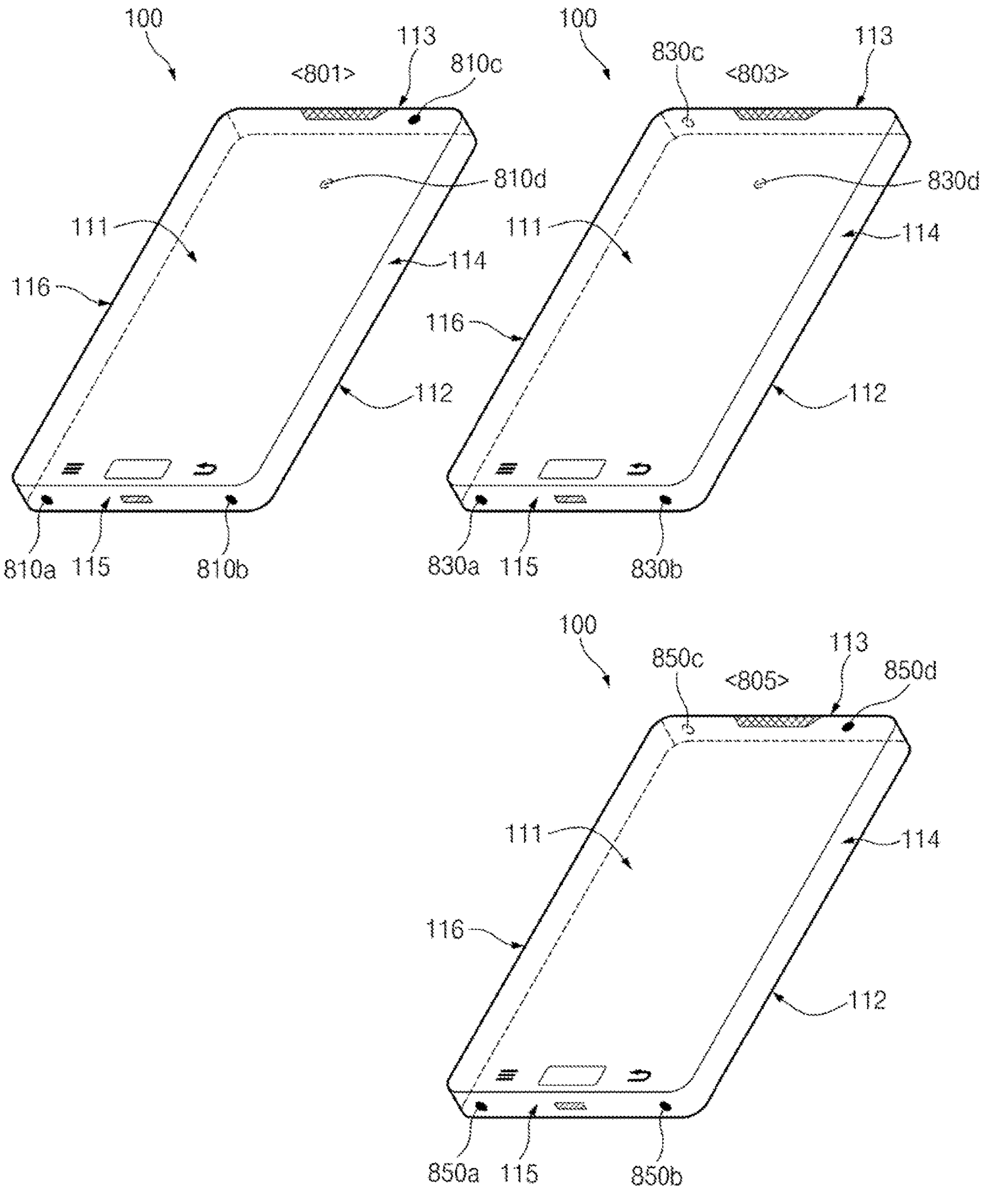
FIG. 8 is a diagram of an example of an electronic device including four microphones according to various embodiments of the present disclosure.

FIG. 8 is a diagram of an example of an electronic device including four microphones according to various embodiments of the present disclosure.

Referring to FIG. 8, an electronic device 100 (or an electronic device 400) may include a front part 111, a rear part 112, an upper part 113, a right part 114, a lower part 115, and a left part 116. The electronic device 100, as shown in a state 801, may include a microphone 810*a* and a microphone 810*b* disposed at the lower part 115, a microphone 810*c* disposed at the front part 111, and a microphone 810*d* disposed at the rear part 112. The microphone 810*a* may be biased towards the left of the lower part 115. The microphone 810*b* may be biased towards the right of the lower part 115. The microphone 810*c* may be biased towards the upper right of the front part 111. The microphone 810*d* may be disposed at the upper center of the rear part 112. The electronic device 100 may process noise suppression in a handset state by using the microphone 810*a*, the microphone 810*b*, and the microphone 810*d*. Alternatively, the electronic device 100 may perform noise suppression in a hands-free state by using the microphone 810*a*, the microphone 810*b*, the microphone 810*c*, and the microphone 810*d*. Additionally, the electronic device 100 may support a voice recording function and an audio zoom function by using the microphone 810*a*, the microphone 810*b*, the microphone 810*c*, and the microphone 810*d*. The electronic device 100 may support an ANC function by using the microphone 810*c* disposed at the front part 111 and the microphone 810*d* disposed at the rear part 112.

In relation to a handset noise suppression function, the electronic device 100 shown in the state 801 may provide improved noise cancellation by using the microphone 810*d* disposed at the rear part 112. Additionally, the electronic device 100 may easily collect a speech signal during a position change according to device gripping by using the microphone 810*a* and the microphone 810*b* at the lower part 115 so that SNR based noise cancellation and voice maintenance gain may be provided. In relation to a hands-free noise suppression function, the electronic device 100 may support feature extraction and beamforming-based noise cancellation by using the microphone 810*a*, the microphone 810*b*, the microphone 810*c*, and the microphone 810*d*. In relation to a voice recording function, the electronic device 100 may support two-dimensional and also three-dimensional beamforming on the basis of the microphone 810*d* disposed at the rear part 112 at a different position on a Z-axis so that voice tracking support and noise cancellation performance improvement may be provided. Additionally, in relation to an audio zoom function, the electronic device 100 may capture a voice in a capturing direction in a combination of the microphone 810*d*, the microphone 810*a*, and the microphone 810*b* during video capturing in order to improve an audio zoom function. Additionally, the electronic device 100 may support voice capture via the microphone 810*c*, the microphone 810*a*, and the microphone 810*b*, and audio zoom performance improvement and surrounding noise cancellation according thereto. Additionally, the electronic device 100 may provide a forward type ANC using the microphone 810*d* disposed at the rear part 112 and may support a hybrid type ANC function with a backward type using the microphone 810*c*.

According to various embodiments of the present disclosure, the electronic device 100, as shown in a state 803, may include the microphone 830*a* and the microphone 830*b* disposed at the lower part 115, the microphone 810*c* disposed at the upper part 113, and the microphone 830*d* disposed at the rear part 112. The microphone 830*a* may be biased towards the left of the lower part 115. The microphone 830*b* may be biased towards the right of the lower part 115. The microphone 830*c* may be biased towards the left of the upper part 113. The microphone 830*d* may be disposed at the upper center of the rear part 112.

The electronic device 100 may perform various function supports according to a combination of microphones. According to an embodiment of the present disclosure, the electronic device 100 supports a handset noise suppression function and a hands-free noise suppression function by using the four microphones 830*a*, 830*b*, 830*c*, and 830*d* and thus improves voice quality through noise cancellation. Additionally, the electronic device 100 may support a voice recording function by using the four microphones 830*a*, 830*b*, 830*c*, and 830*d* and also support voice tracking and noise cancellation on the basis of a two-dimensional or three-dimensional beamforming. Additionally, the electronic device 100 may support an audio zoom function for a sound source at the capturing side or an audio zoom function for a sound source at the capturing side during video capturing and may support surrounding noise cancellation while this function is provided.

According to various embodiments of the present disclosure, as shown in the state 805, the electronic device 100 may include the microphone 850*a* and the microphone 850*b* disposed at the lower part 115, the microphone 850*c* disposed at the upper part 113, and the microphone 850*d* disposed at the front part 111. The microphones 850*a* may be biased towards the left of the lower part 115 and may be biased towards the right of the lower part 115. Alternatively, the microphones 850*c* may be biased towards the left of the upper part 113 and the microphone 850*d* may be biased towards the upper right of the front part 111. The electronic device 100 may support a handset noise suppression function by using the microphone 850*a* and the microphone 850*b* disposed at the lower part 115 and the microphone 850*c* disposed at the upper part 113. The electronic device 100 may support a hands-free noise suppression function and a voice recording function by using the microphones 850*a*, 850*b*, 850*c*, and 850*d*. Additionally, the electronic device 100 may support an ANC function (for example, an ANC function of a hybrid type combining forward and backward types) by using the microphone 850*c* disposed at the upper part 113 and the microphone 850*d* disposed at the front part 111.

Figure 9:
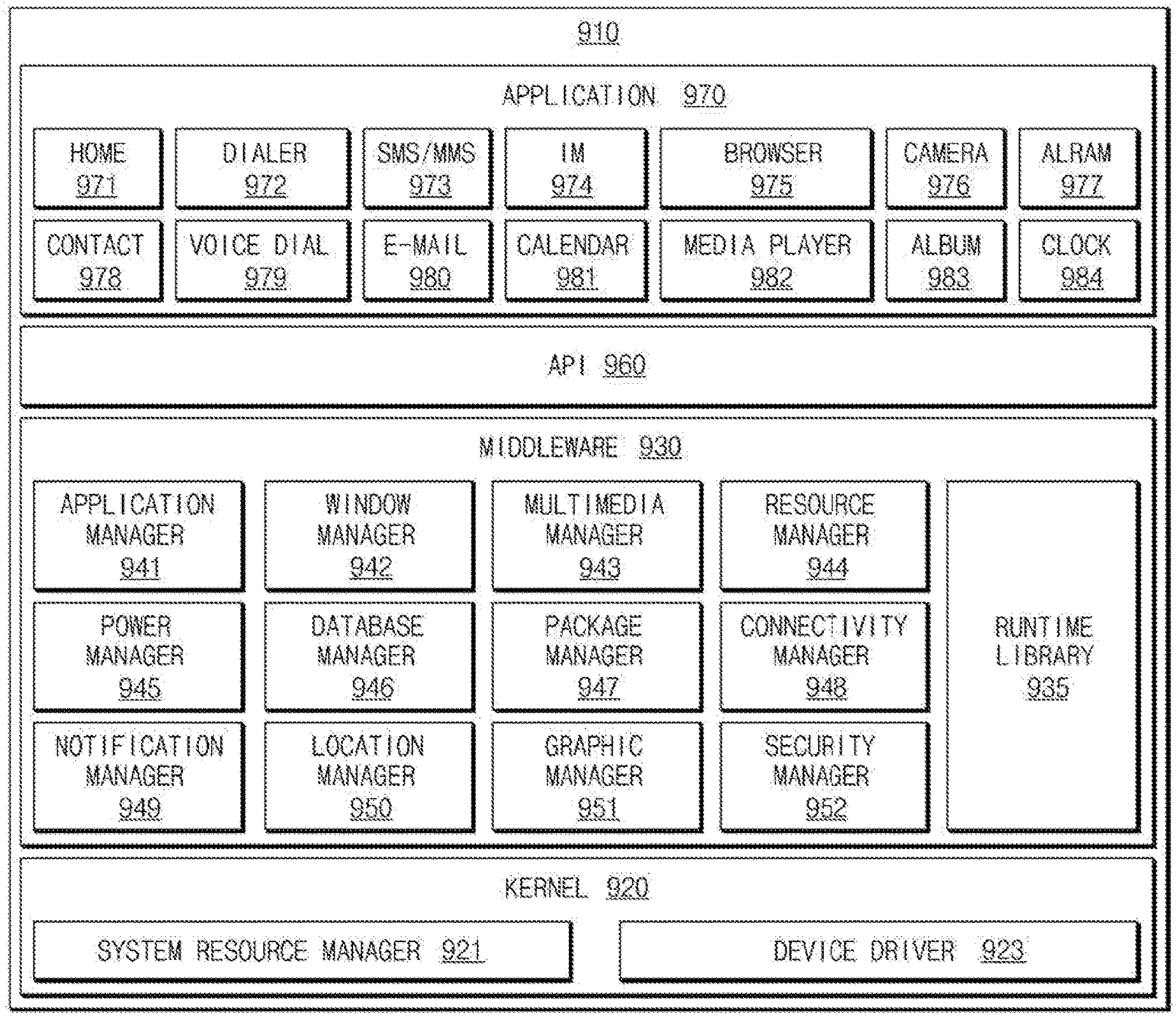
FIG. 9 is a diagram of an example of a program module according to various embodiments of the present disclosure.

FIG. 9 is a diagram of an example of a program module according to various embodiments of the present disclosure.

Referring to FIG. 9, according to an embodiment of the present disclosure, the program module 910 may include an operating system (OS) for controlling a resource relating to an electronic device (for example, the electronic device 100 or the electronic device 400) and/or various applications (for example, the application 447) running on the OS. The OS, for example, may include android, iOS, windows, Symbian, tizen, or bada.

The program module 910 may include an OS and an application 970. The OS may include a kernel 920, a middleware 930, and an API 960. At least part of the program module 910 may be preloaded on an electronic device or may be downloaded from a server (for example, the server 404).

The kernel 920, for example, may include a system resource manager 921 or a device driver 923. The system resource manager 921 may perform the control, allocation, or retrieval of a system resource. According to an embodiment of the disclosure, the system resource manager 921 may include a process management unit, a memory management unit, or a file system management unit. The device driver 923, for example, a display driver, a camera driver, a Bluetooth driver, a sharing memory driver, a USB driver, a keypad driver, a WiFi driver, an audio driver, or an inter-process communication (IPC) driver.

The middleware 930, for example, may provide a function that the application 970 requires commonly, or may provide various functions to the application 970 through the API 960 in order to allow the application 970 to efficiently use a limited system resource inside the electronic device. According to an embodiment of the disclosure, the middleware 930 may include at least one of a runtime library 935, an application manager 941, a window manager 942, a multimedia manager 943, a resource manager 944, a power manager 945, a database manager 946, a package manager 947, a connectivity manager 948, a notification manager 949, a location manager 950, a graphic manager 951, and a security manager 952.

The runtime library 935, for example, may include a library module that a compiler uses to add a new function through a programming language while the application 970 is running. The runtime library 935 may perform a function on input/output management, memory management, or an arithmetic function.

The application manager 941, for example, may manage the life cycle of at least one application among the applications 970. The window manager 942 may manage a GUI resource used in a screen. The multimedia manager 943 may recognize a format for playing various media files and may encode or decode a media file by using the codec corresponding to a corresponding format. The resource manager 944 may manage a resource such as a source code, a memory, or a storage space of at least any one of the applications 970.

The power manager 945, for example, may operate together with a basic input/output system (BIOS) to manage the battery or power and may provide power information necessary for an operation of the electronic device. The database manager 946 may create, search, or modify a database used in at least one application among the applications 970. The package manager 947 may manage the installation or update of an application distributed in a package file format.

The connectivity manager 948 may manage a wireless connection such as WiFi or Bluetooth. The notification manager 949 may display or notify an event such as arrival messages, appointments, and proximity alerts to a user in a manner of not interrupting the user. The location manager 950 may manage location information on an electronic device. The graphic manager 951 may manage a graphic effect to be provided to a user or a user interface relating thereto. The security manager 952 may provide various security functions necessary for system security or user authentication. According to an embodiment of the present disclosure, when an electronic device (for example, the electronic device 100 or the electronic device 400) includes a phone function, the middleware 930 may further include a telephony manager for managing a voice or video call function of the electronic device.

The middleware 930 may include a middleware module for forming a combination of various functions of the above-mentioned components. The middleware 930 may provide a module specialized for each type of OS to provide differentiated functions. Additionally, the middleware 930 may delete part of existing components or add new components dynamically.

The API 960, for example, as a set of API programming functions, may be provided as another configuration according to OS. For example, in the case of android or iOS, one API set may be provided for each platform and in the case Tizen, at least two API sets may be provided for each platform.

The application 970 (for example, the application 447) may include at least one application for providing functions such as a home 971, a dialer 972, an SMS/MMS 973, an instant message 974, a browser 975, a camera 976, an alarm 977, a contact 978, a voice dial 979, an e-mail 980, a calendar 981, a media player 982, an album 983, a clock 984, health care (for example, measure an exercise amount or blood sugar), or environmental information provision (for example, provide air pressure, humidity, or temperature information).

According to an embodiment of the disclosure, the application 970 may include an application (hereinafter referred to as “information exchange application”) for supporting information exchange between the electronic device (for example, the electronic device 100 or the electronic device) and an external electronic device (for example, the electronic device 402). The information exchange application, for example, may include a notification relay application for relaying specific information to the external device or a device management application for managing the external electronic device.

For example, the notification relay application may have a function for relaying to an external electronic device (for example, the electronic device 402) notification information occurring from another application (for example, an SMS/MMS application, an e-mail application, a health care application, or an environmental information application) of the electronic device. Additionally, the notification relay application may receive notification information from an external electronic device and may then provide the received notification information to a user. The device management application, for example, may manage (for example, install, delete, or update) at least one function (turn-on/turn off of the external electronic device itself (or some components) or the brightness (or resolution) adjustment of a display) of an external electronic device (for example, the electronic device 402) communicating with the electronic device, an application operating in the external electronic device, or a service (for example, call service or message service) provided from the external device.

According to an embodiment of the disclosure, the application 970 may include a specified application (for example, a health care application) according to the property (for example, as the property of an electronic device, when the type of the electronic device is a mobile medical device) of the external electronic device (for example, the electronic device 402). According to an embodiment of the present disclosure, the application 970 may include an application received from an external electronic device (for example, the server device 404 or the electronic device 402). According to an embodiment of the disclosure, the application 970 may include a preloaded application or a third party application downloadable from a server. The names of components in the program module 910 according to the shown embodiment may vary depending on the type of OS.

According to various embodiments of the present disclosure, at least part of the program module 910 may be implemented with software, firmware, hardware, or a combination thereof. At least part of the programming module 910, for example, may be implemented (for example, executed) by a processor (for example, the AP 420). At least part of the programming module 910 may include a module, a program, a routine, sets of instructions, or a process to perform at least one function, for example.

Figure 10:
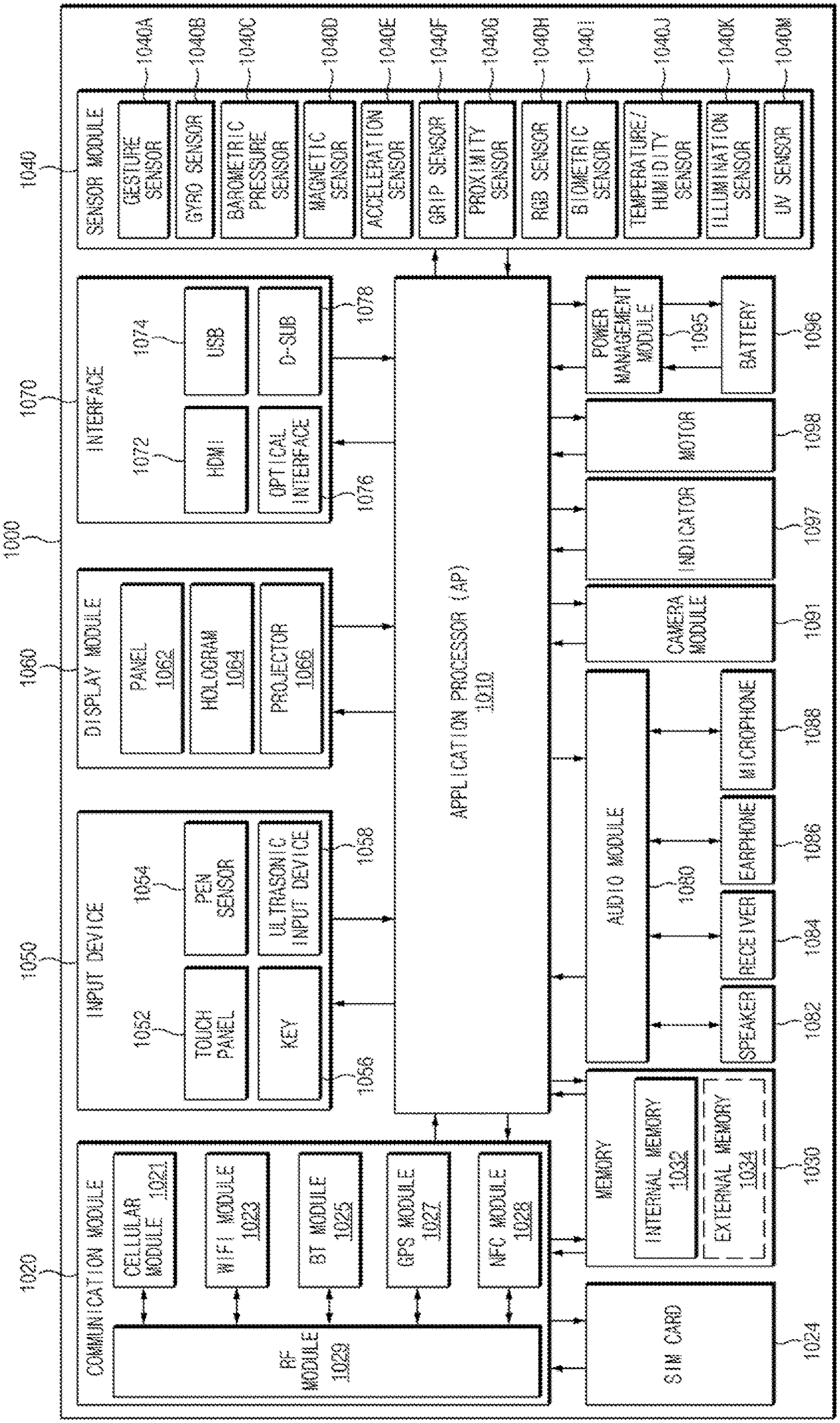
FIG. 10 is a diagram of an example of an electronic device according to various embodiments of the present disclosure.

FIG. 10 is a diagram of an example of an electronic device according to various embodiments of the present disclosure.

Referring to FIG. 10, an electronic device 1000, for example, may include all or part of the electronic device 100 or the electronic device 400 shown in FIG. 1, 2, 3, 4, 7, or 8. The electronic device 1000 may include application processor (AP) 1010, a communication module 1020, a subscriber identification module (SIM) card 1024, a memory 1030, a sensor module 1040, an input device 1050, a display 1060, an interface 1070, an audio module 1080, a camera module 1091, a power management module 1095, a battery 1096, an indicator 1097, and a motor 1098.

The AP 1010 may control a plurality of hardware or software components connected to the AP 1010 and also may perform various data processing and operations by executing an operating system or an application program. The AP 1010 may be implemented with a system on chip (SoC), for example. According to an embodiment of the present disclosure, the AP 1010 may further include a graphic processing unit (GPU) (not shown) and/or an image signal processor. The AP 1010 may include at least part (for example, the cellular module 1021) of components shown in FIG. 10. The AP 1010 may load commands or data received from at least one of other components (for example, nonvolatile memory) and process them and may store various data in a nonvolatile memory.

The communication module 1020 may have the same or similar configuration to the communication interface 460 of FIG. 4. The communication module 1020 may include a cellular module 1021, a WiFi module 1023, a BT module 1025, a GPS module 1027, an NFC module 1028, and a radio frequency (RF) module 1029.

The cellular module 1021, for example, may provide voice call, video call, text service, or internet service through communication network. According to an embodiment of the present disclosure, the cellular module 1021 may perform a distinction and authentication operation on the electronic device 1000 in a communication network by using a subscriber identification module (for example, the SIM card 1024). According to an embodiment of the present disclosure, the cellular module 1021 may perform at least part of a function that the AP 1010 provides. According to an embodiment of the present disclosure, the cellular module 1021 may further include a communication processor (CP).

Each of the WiFi module 1023, the BT module 1025, the GPS module 1027, and the NFC module 1028 may include a processor for processing data transmitted/received through a corresponding module. According to an embodiment of the present disclosure, at least part (for example, at least one) of the cellular module 1021, the WiFi module 1023, the BT module 1025, the GPS module 1027, and the NFC module 1028 may be included in one integrated chip (IC) or IC package.

The RF module 1029, for example, may transmit/receive communication signals (for example, RF signals). The RF module 1029, for example, may include a transceiver, a power amp module (PAM), a frequency filter, a low noise amplifier (LNA), or an antenna. According to another embodiment of the present disclosure, at least one of the cellular module 1021, the WiFi module 1023, the BT module 1025, the GPS module 1027, and the NFC module 1028 may transmit/receive RF signals through a separate RF module.

The SIM card 1024 may include a card including a SIM and/or an embedded SIM and also may include unique identification information (for example, an integrated circuit card identifier (ICCID)) or subscriber information (for example, an international mobile subscriber identity (IMSI)).

The memory 1030 (for example, the memory 430) may include an internal memory 1032 or an external memory 1034. The internal memory 1032 may include at least one of a volatile memory (for example, dynamic RAM (DRAM), static RAM (SRAM), synchronous dynamic RAM (SDRAM)) and a non-volatile memory (for example, one-time programmable ROM (OTPROM), programmable ROM (PROM), erasable and programmable ROM (EPROM), electrically erasable and programmable ROM (EEPROM), mask ROM, flash ROM, NAND flash memory, and NOR flash memory).

The external memory 1034 may further include flash drive, for example, compact flash (CF), secure digital (SD), micro Micro-SD, Mini-SD, extreme digital (xD), or a memory stick. The external memory 1034 may be functionally and/or physically connected to the electronic device 1000 through various interfaces.

The sensor module 1040 measures physical quantities or detects an operating state of the electronic device 1000, thereby converting the measured or detected information into electrical signals. The sensor module 1040 may include at least one of a gesture sensor 1040A, a gyro sensor 1040B, a barometric pressure sensor 1040C, a magnetic sensor 1040D, an acceleration sensor 1040E, a grip sensor 1040F, a proximity sensor 1040G, a color sensor 1040H (for example, a red, green, blue (RGB) sensor), a biometric sensor 1040I, a temperature/humidity sensor 1040J, an illumination sensor 1040K, and an ultra violet (UV) sensor 1040M. Additionally or alternatively, the sensor module 1040 may include an E-nose sensor, an electromyography (EMG) sensor, an electroencephalogram (EEG) sensor, an electrocardiogram (ECG) sensor, an infra red (IR) sensor, an iris sensor, or a fingerprint sensor. The sensor module 1040 may further include a control circuit for controlling at least one sensor therein. According to an embodiment of the present disclosure, the electronic device 1000 may further include a processor configured to control the sensor module 1040 as part of or separately from the AP 1010 and thus may control the sensor module 1040 while the AP 1010 is in a sleep state.

The input device 1050 may include a touch panel 1052, a (digital) pen sensor 1054, a key 1056, or an ultrasonic input device 1058. The touch panel 1052 may use at least one of capacitive, resistive, infrared, or ultrasonic methods, for example. Additionally, the touch panel 1052 may further include a control circuit. The touch panel 1052 may further include a tactile layer to provide tactile response to a user.

The (digital) pen sensor 1054, for example, may include a sheet for recognition as part of a touch panel or a separate sheet for recognition. The key 1056 may include a physical button, an optical key, or a keypad, for example. The ultrasonic input device 1058 may check data by detecting sound waves through a microphone (for example, a microphone 1088) in the electronic device 1000 through an input tool generating ultrasonic signals.

The display 1060 (for example, the display 450) may include a panel 1062, a hologram device 1064, or a projector 1066. The panel 1062 may have the same or similar configuration to the display 450 of FIG. 4. The panel 1062 may be implemented to be flexible, transparent, or wearable, for example. The panel 1062 and the touch panel 1052 may be configured with one module. The hologram device 1064 may show three-dimensional images in the air by using the interference of light. The projector 1066 may display an image by projecting light on a screen. The screen, for example, may be placed inside or outside the electronic device 1000. According to an embodiment of the present disclosure, the display 1060 may further include a control circuit for controlling the panel 1062, the hologram device 1064, or the projector 1066.

The interface 1070 may include a high-definition multimedia interface (HDMI) 1072, a universal serial bus (USB) 1074, an optical interface 1076, or a D-subminiature (sub) 1078, for example. The interface 1070, for example, may be included in the communication interface 460 shown in FIG. 4. Additionally or alternately, the interface 1070 may include a mobile high-definition link (MHL) interface, a secure Digital (SD) card/multi-media card (MMC) interface, or an infrared data association (IrDA) standard interface.

The audio module 1080 may convert sound into electrical signals and convert electrical signals into sounds. At least some components of the audio module 1080, for example, may be included in the input/output interface 470 shown in FIG. 4. The audio module 1080 may process sound information inputted/outputted through a speaker 1082, a receiver 1084, an earphone 1086, or a microphone 1088.

The camera module 1091, as a device for capturing a still image and a video, may include at least one image sensor (for example, a front sensor or a rear sensor), a lens (not shown), an image signal processor (ISP) (not shown), or a flash (not shown) (for example, an LED or a xenon lamp).

The power management module 1095 may manage the power of the electronic device 1000. According to an embodiment of the present disclosure, the power management module 1095 may include a power management IC (PMIC), a charger IC, or a battery or fuel gauge, for example. The PMIC may have a wired and/or wireless charging method. As the wireless charging method, for example, there is a magnetic resonance method, a magnetic induction method, or an electromagnetic method. An additional circuit for wireless charging, for example, a circuit such as a coil loop, a resonant circuit, or a rectifier circuit, may be added. The battery gauge may measure the remaining amount of the battery 1096, or a voltage, current, or temperature thereof during charging. The battery 1096, for example, may include a rechargeable battery and/or a solar battery.

The indicator 1097 may display a specific state of the electronic device 1000 or part thereof (for example, the AP 1010), for example, a booting state, a message state, or a charging state. The motor 1098 may convert electrical signals into mechanical vibration and may generate vibration or haptic effect. Although not shown in the drawings, the electronic device 1000 may include a processing device (for example, a GPU) for mobile TV support. A processing device for mobile TV support may process media data according to the standards such as digital multimedia broadcasting (DMB), digital video broadcasting (DVB), or mediaFLO.

As mentioned above, various embodiments may support clear voice recognition and direction separation.

Additionally, various embodiments may perform a more intuitive microphone control according to a usage environment.

Each of the above-mentioned components of the electronic device according to various embodiments of the present disclosure may be configured with at least one component and the name of a corresponding component may vary according to the kind of an electronic device. According to various embodiments of the present disclosure, an electronic device according to various embodiments of the present disclosure may include at least one of the above-mentioned components, may not include some of the above-mentioned components, or may further include another component. Additionally, some of components in an electronic device according to various embodiments of the present disclosure are configured as one entity, so that functions of previous corresponding components are performed identically.

The term "module" used in various embodiments of the present disclosure, for example, may mean a unit including a combination of at least one of hardware, software, and firmware. The term "module" and the term "unit", "logic", "logical block", "component", or "circuit" may be interchangeably used. A "module" may be a minimum unit or part of an integrally configured component. A "module" may be a minimum unit performing at least one function or part thereof. A "module" may be implemented mechanically or electronically. For example, "module" according to various embodiments of the present disclosure may include at least one of an application-specific integrated circuit (ASIC) chip performing certain operations, field-programmable gate arrays (FPGAs), or a programmable-logic device, all of which are known or to be developed in the future.

According to various embodiments of the present disclosure, at least part of a device (for example, modules or functions thereof) or a method (for example, operations) according to this disclosure, for example, as in a form of a programming module, may be implemented using an instruction stored in computer-readable storage media. When at least one processor (for example, the processor 90) executes an instruction, it may perform a function corresponding to the instruction. The non-transitory computer-readable storage media may include the memory 430, for example.

The non-transitory computer-readable storage media may include hard disks, floppy disks, magnetic media (for example, magnetic tape), optical media (for example, CD-ROM, and DVD), magneto-optical media (for example, floptical disk), and hardware devices (for example, ROM, RAM, or flash memory). Additionally, a program instruction may include high-level language code executable by a computer using an interpreter in addition to machine code created by a compiler. The hardware device may be configured to operate as at least one software module to perform an operation of various embodiments of the present disclosure and vice versa.

According to various embodiments of the present disclosure, a computer readable recording medium stores at least one instruction executable by at least one processor, and the at least one instruction may be set to perform: checking a type of an application requested for execution; and separately processing activation states of microphones in correspondence to the type of the application and an arrangement position of the microphones.

A module or a programming module according to various embodiments of the present disclosure may include at least one of the above-mentioned components, may not include some of the above-mentioned components, or may further include another component. Operations performed by a module, a programming module, or other components according to various embodiments of the present disclosure may be executed through a sequential, parallel, repetitive or heuristic method. Additionally, some operations may be executed in a different order or may be omitted. Or, other operations may be added.

FIGS. 1-10 are provided as an example only. At least some of the steps discussed with respect to these figures can be performed concurrently, performed in a different order, and/or altogether omitted. It will be understood that the provision of the examples described herein, as well as clauses phrased as "such as," "e.g.", "including", "in some aspects," "in some implementations," and the like should not be interpreted as limiting the claimed subject matter to the specific examples.

The above-described aspects of the present disclosure can be implemented in hardware, firmware or via the execution of software or computer code that can be stored in a recording medium such as a CD-ROM, a Digital Versatile Disc (DVD), a magnetic tape, a RAM, a floppy disk, a hard disk, or a magneto-optical disk or computer code downloaded over a network originally stored on a remote recording medium or a non-transitory machine-readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein. Any of the functions and steps provided in the Figures may be implemented in hardware, software or a combination of both and may be performed in whole or in part within the programmed instructions of a computer. No claim element herein is to be construed under the provisions of 35 U.S.C. 112, sixth paragraph, unless the element is expressly recited using the phrase "means for".

While the present disclosure has been particularly shown and described with reference to the examples provided therein, it will be understood by those skilled in the art that various changes in form and details may be made therein without departing from the spirit and scope of the present disclosure as defined by the appended claims.

What is claimed is:

1. A portable communication device comprising:

a front cover forming at least part of a front surface of the portable communication device, the front cover including a first opening formed therein;

a rear cover forming at least part of a rear surface of the portable communication device, the rear cover including a second opening formed therein;

a peripheral member at least partially forming a plurality of side surfaces of the portable communication device, the plurality of side surfaces including a first side surface including a third opening formed therein;

a display viewable through the front cover;

a plurality of microphones including a first microphone, a second microphone and a third microphone, the first microphone configured to receive a sound through the first opening, the second microphone configured to receive the sound through the second opening, and the third microphone configured to receive the sound through the third opening; and a processor configured to:

execute an application to control a camera to record a video, the recording of the video including recording audio data, determining which ones of the first microphone, the second microphone, and the third microphone to activate, based on a type of the application;

during recording of the audio data, control to apply an audio zoom effect corresponding to a capturing direction of the video according to a user setting, control to lower at least a portion of a sound signal obtained from a first direction corresponding to an opposite direction of the capturing direction while obtaining at least a portion of a sound signal from a second direction corresponding to the capturing direction.

2. The portable communication device of claim 1, wherein the user setting is received during recording of the video.

3. The portable communication device of claim 1, wherein the processor is configured to:

receive, while the video is recorded, a user input to control a performance of at least one of the first, second or third microphone; and obtaining of a first sound signal from the first microphone and a second sound signal from the second microphone, based at least in part on the user input.

4. The portable communication device of claim 1, wherein recording the audio data further comprises:

applying a weight value to the first microphone differently than to the second microphone.

5. The portable communication device of claim 3, wherein the processor is configured to:

determine a weight value based at least in part on the first direction.

6. The portable communication device of claim 1, wherein the processor is configured to:

display a user interface configured to receive a user input to enable applying the audio zoom effect.

7. The portable communication device of claim 1, wherein the processor is configured to:

display, on the display, a user interface configured to receive a user input to enable applying the audio zoom effect based at least in part on the second direction.

8. The portable communication device of claim 1, wherein the processor configured to: control to process the at least the portion of the sound signal obtained from the first direction as a noise.

9. The portable communication device of claim 1, wherein the processor configured to: control to raise volume of a voice signal among the sound signal obtained from the second direction.

10. A portable communication device comprising:

a front cover forming at least part of a front surface of the portable communication device, the front cover including a first opening formed therein;

a rear cover forming at least part of a rear surface of the portable communication device, the rear cover including a second opening formed therein;

a peripheral member at least partially forming a plurality of side surfaces of the portable communication device, the plurality of side surfaces including a first side surface including a third opening formed therein;

a display viewable through the front cover;

a plurality of microphones including a first microphone, a second microphone and a third microphone, the first microphone configured to receive a sound through the first opening, the second microphone configured to receive the sound through the second opening, and the third microphone configured to receive the sound through the third opening; and a processor configured to:

control a camera to record a video, the recording of the video including recording audio data based on first sound signal obtained from the first microphone, second sound signal obtained from the second microphone and third sound signal obtained from the third microphone, during recording of the audio data, control to apply an audio zoom effect corresponding to a capturing direction of the video according to a user setting, control to lower at least a portion of a sound signal obtained from a first direction corresponding to an opposite direction of the capturing direction while obtaining at least a portion of a sound signal from a second direction corresponding to the capturing direction, and control beamforming in the first direction based on the second microphone and the third microphone, and the second direction based on the first microphone and the third microphone.

* * * * *